United States Patent
Mao et al.

(10) Patent No.: US 12,196,968 B2
(45) Date of Patent: Jan. 14, 2025

(54) LENS AND HEAD-MOUNTED DISPLAY APPARATUS

(71) Applicant: HUAWEI TECHNOLOGIES CO., LTD., Shenzhen (CN)

(72) Inventors: Chunjing Mao, Shanghai (CN); Cheng Lo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 454 days.

(21) Appl. No.: 17/629,705

(22) PCT Filed: Jul. 17, 2020

(86) PCT No.: PCT/CN2020/102526
§ 371 (c)(1),
(2) Date: Jan. 24, 2022

(87) PCT Pub. No.: WO2021/017885
PCT Pub. Date: Feb. 4, 2021

(65) Prior Publication Data
US 2022/0283437 A1    Sep. 8, 2022

(30) Foreign Application Priority Data
Jul. 31, 2019 (CN) .......... 201910703281.X

(51) Int. Cl.
G02B 27/01   (2006.01)
G02B 1/11    (2015.01)
G02B 27/12   (2006.01)

(52) U.S. Cl.
CPC ............ *G02B 27/0172* (2013.01); *G02B 1/11* (2013.01); *G02B 27/126* (2013.01); *G02B 2027/0178* (2013.01)

(58) Field of Classification Search
CPC ..... G02B 27/00–648; G02B 2027/0105–0198; G02B 1/11
See application file for complete search history.

(56) References Cited

U.S. PATENT DOCUMENTS

| | | | |
|---|---|---|---|
| 10,600,352 B1 * | 3/2020 | Wheelwright | ....... G03H 1/0248 |
| 2014/0098425 A1 | 4/2014 | Peter et al. | |
| 2014/0375789 A1 | 12/2014 | Lou et al. | |

(Continued)

FOREIGN PATENT DOCUMENTS

| | | |
|---|---|---|
| CN | 203433192 U | 2/2014 |
| CN | 204076964 U | 1/2015 |

(Continued)

*Primary Examiner* — Bao-Luan Q Le
*Assistant Examiner* — Christopher A Lamb, II
(74) *Attorney, Agent, or Firm* — Rimon PC

(57) ABSTRACT

A head-mounted display apparatus-includes a lens frame, a lens, and a display module. Both the lens and the display module are disposed on the lens frame. The lens includes a first part and a second part. The first part is adjacent to the second part. The first part is configured to transmit ambient light. The second part is configured to transmit the ambient light and display light emitted by the display module. A ratio of the transmittance of the second part to the transmittance of the first part is within a threshold range. In one embodiment, the threshold range may be between 0.5 to 1.5.

19 Claims, 16 Drawing Sheets

(56) References Cited

U.S. PATENT DOCUMENTS

| | | | |
|---|---|---|---|
| 2015/0234193 A1 | 8/2015 | Lyons | |
| 2016/0026253 A1 | 1/2016 | Bradski et al. | |
| 2018/0348411 A1* | 12/2018 | Yamaki | G02B 5/0278 |
| 2019/0146198 A1 | 5/2019 | Khan et al. | |
| 2019/0179409 A1 | 6/2019 | Jones et al. | |

FOREIGN PATENT DOCUMENTS

| | | |
|---|---|---|
| CN | 105934902 A | 9/2016 |
| CN | 106164745 A | 11/2016 |
| CN | 106680994 A | 5/2017 |
| CN | 106842599 A | 6/2017 |
| CN | 108027507 A | 5/2018 |
| CN | 207457609 U | 6/2018 |
| CN | 207780380 U | 8/2018 |
| CN | 110426853 A | 11/2019 |
| CN | 210666202 U | 6/2020 |
| KR | 101681657 B1 | 12/2016 |
| WO | 2019084322 A1 | 5/2019 |

* cited by examiner

LENS AND HEAD-MOUNTED DISPLAY APPARATUS

CROSS-REFERENCE TO RELATED APPLICATIONS

This application is a National Stage of International Application No. PCT/CN2020/102526, filed on Jul. 17, 2020, which claims priority to Chinese Patent Application No. 201910703281.X, filed on Jul. 31, 2019, both of which are hereby incorporated by reference in its entirety.

TECHNICAL FIELD

This application relates to the field of display technologies, and in particular, to a lens and a head-mounted display apparatus.

BACKGROUND

Augmented reality (AR) applies virtual information to a real world, so that a real environment and a virtual object appear in one image or one space. With continuous development of the AR technology, a user can visually see, by using a head-mounted display apparatus, an image obtained by superposing a virtual object in a real environment. A conventional head-mounted display apparatus includes a lens. The lens is a key component for transmitting display light and ambient light to a human eye. However, if the structure of the lens of the head-mounted display apparatus is not properly arranged, an image displayed by the conventional head-mounted display apparatus is of poor quality, thereby causing recognition discomfort to the human eye.

SUMMARY

Embodiments of this application provide a lens and a head-mounted display apparatus. Quality of an image presented by the head-mounted display apparatus needs to be improved.

According to a first aspect, a head-mounted display apparatus provided in an embodiment of this application includes a lens frame, a lens, and a display module. Both the lens and the display module are disposed on the lens frame. The lens includes a first part and a second part. The first part is adjacent to the second part. It can be understood that, that the first part is adjacent to the second part indicates that the second part is located at a periphery of the first part. The first part is configured to transmit ambient light. The second part is configured to transmit the ambient light. The first part is further configured to transmit display light emitted by the display module. A ratio of a transmittance of the second part to a transmittance of the first part is within a threshold range. The threshold range is 0.5 to 1.5.

In this embodiment, when the ratio of the transmittance of the second part to the transmittance of the first part ranges from 0.5 to 1.5, the transmittance of the second part is relatively close to that of the first part. In this case, when a user wears the head-mounted display apparatus, the brightness of different regions of the lens is relatively uniform, so that the quality of an image displayed by the head-mounted display apparatus is relatively good.

In addition, because the transmittance of the second part is relatively close to that of the first part, the brightness of a real world seen by the user through the second part is the same as or similar to that of the real world seen through the first part. Therefore, when the eyes of the user move and the eyes of the user are shifted from directly facing the first part to obliquely facing the second part, the user does not feel uncomfortable due to a large difference in brightness of received ambient light. The head-mounted display apparatus in this embodiment provides better user experience.

In an embodiment, the first part includes a free-form prism, a beam splitter, and a compensating prism that are sequentially stacked. The beam splitter is disposed between the free-form prism and the compensating prism. The free-form prism includes a first incident plane, a first exit plane, and a second incident plane. The first incident plane is adjacent to the beam splitter. That the first part is configured to transmit ambient light includes: The compensating prism is configured to receive the ambient light, and the ambient light passes through the beam splitter, enters from the first incident plane of the free-form prism, and passes through the first exit plane. That the first part is further configured to transmit display light emitted by the display module includes: The second incident plane of the free-form prism is configured to receive the display light emitted by the display module, and the beam splitter is configured to reflect, to the first exit plane, the display light received by the second incident plane.

In this embodiment, the first part is configured to include the free-form prism, the beam splitter, and the compensating prism that are sequentially stacked, so that the display light emitted by the display module and the ambient light are transmitted to the eyes of the user by using the free-form prism, the beam splitter, and the compensating prism. Therefore, an image obtained by combining an image of a real world with a virtual image can be viewed by using the head-mounted display apparatus, thereby improving user experience of the head-mounted display apparatus.

In an embodiment, the second part includes an optical lens and an anti-reflective film. It can be understood that the anti-reflective film is configured to reduce a permeability of the ambient light, so as to reduce the transmittance of the second part. The optical lens includes a first incident plane and a second exit plane that back each other. The anti-reflective film is located between the first incident plane and the second exit plane. The ambient light sequentially passes through the first incident plane and the anti-reflective film, and then exits from the second exit plane.

In this embodiment, the anti-reflective film is disposed between the first incident plane and the second exit plane to reduce the transmittance of the second part. The transmittance of the second part is close to that of the first part. In this case, when the user wears the head-mounted display apparatus, no large brightness difference occurs between the first part and the second part of the lens. To be specific, brightness of a real world seen by the user through the second part is approximately the same as that of a real world seen through the first part. Therefore, when the eyes of the user move and are shifted from directly facing the first part to obliquely facing the second part, the user does not feel uncomfortable due to a large difference in brightness of received ambient light, thereby improving user experience of the head-mounted display apparatus in this embodiment.

In an embodiment, an edge of the anti-reflective film is connected to an edge of the beam splitter. In this case, ambient light entering the second part through the first incident plane or ambient light entering the first part through the compensating prism can pass through the anti-reflective film or the beam splitter only once, that is, the ambient light does not pass through the anti-reflective film and the beam splitter at the same time, thereby ensuring that brightness of regions of the entire lens is relatively uniform, that is, the entire lens has relatively good light transmission uniformity. This ensures that the user does not feel uncomfortable due to a large difference in brightness of received ambient light.

In an embodiment, a first side surface of the first part is adjacent to a second side surface of the second part. A shape of a part, located on the first side surface, of the beam splitter is a first shape. A shape of a part, located on the second side surface, of the anti-reflective film is a second shape. The first shape matches the second shape. It can be understood that, when the first shape matches the second shape, the beam splitter and the anti-reflective film are connected to each other and are attached to each other face to face. In this case, ambient light entering the second part through the first incident plane or ambient light entering the first part through the compensating prism can pass through the anti-reflective film or the beam splitter only once, that is, the ambient light does not pass through the anti-reflective film and the beam splitter at the same time, thereby ensuring that the brightness of different regions of the entire lens is relatively uniform, that is, the entire lens has relatively good light transmission uniformity. This ensures that the user does not feel uncomfortable due to a large difference in brightness of received ambient light.

In an embodiment, the optical lens includes a first light transmission part and a second light transmission part that face each other. A surface of the first light transmission part that is away from the second light transmission part is the first incident plane. A surface of the second light transmission part that is away from the first light transmission part is the second exit plane. The anti-reflective film is disposed between the first light transmission part and the second light transmission part.

In this embodiment, the optical lens includes the first light transmission part and the second light transmission part, and the anti-reflective film is conveniently disposed in the optical lens, thereby simplifying the process of mounting the anti-reflective film.

In an embodiment, the anti-reflective film is a plating layer formed, e.g., by using a magnetron sputtering or vapor deposition process, on a surface of the first light transmission part that faces the second light transmission part or a surface of the second light transmission part that faces the first light transmission part.

In this embodiment, the process of forming the anti-reflective film is simple and is easy to perform.

In an embodiment, the anti-reflective film includes one or more of a beam splitter, an absorbing film, or a polarizing film. In this case, because the costs of the beam splitter, the absorbing film, or the polarizing film are relatively low, the costs of the integrated lens are also relatively low, that is, the costs of the head-mounted display apparatus are also relatively low.

In an embodiment, the compensating prism has a third incident plane. The third incident plane is provided away from the free-form prism, and the third incident plane is smoothly connected to the first incident plane.

In this embodiment, no abrupt convex or concave region appears at a junction between the first incident plane and the third incident plane of the compensating prism. Therefore, the first incident plane of the lens and the third incident plane are relatively smooth, to make the lens' appearance more appealing. In addition, because no abrupt convex or concave region appears at the junction between the first incident plane and the third incident plane, a propagation direction of ambient light that enters the lens through the junction between the first incident plane and the third incident plane, and a propagation direction of ambient light that passes through the first incident plane and the third incident plane are not greatly different. Therefore, when the eyes of the user are shifted from a location of the first part to a location of the second part, the image of the real world seen by the user does not change greatly or abruptly. In this case, visual comfort of the user is relatively good.

In an embodiment, the second part includes a substrate and a color masterbatch mixed in the substrate.

In this embodiment, the color masterbatch is disposed in the substrate of the second part, so that the transmittance of the second part is reduced by using the color masterbatch. In this case, when the eyes of the user move and are shifted from directly facing the first part to directly facing the second part, the user does not feel uncomfortable due to a large difference in brightness of received ambient light, thereby improving user experience of the head-mounted display apparatus in this embodiment.

In addition, a manner of fabricating the second part is simple and is easy to perform. In addition, transmittances of all regions of the second part are relatively uniform.

In an embodiment, the second part includes a first body part and a second body part. The first body part and the second body part are respectively located on two sides of the first part.

In this embodiment, the second part is configured to include the first body part and the second body part to easily assemble the first part on the second part.

In an embodiment, the second part further includes a third body part. The third body part is disposed between the first body part and the second body part, and the third body part is adjacent to the first exit plane of the first part.

In this embodiment, the lens has relatively high integrity and relatively high structural strength. In addition, the free-form prism is surrounded by the second part, thereby avoiding damage to the free-form prism. In addition, a manner of mounting the first part on the second part is also relatively simple.

In an embodiment, the second part is a ring-shaped structure. The second part has an accommodation space. The first part is disposed in the accommodation space.

In this embodiment, the second part is disposed to have the ring-shaped structure, thereby facilitating assembly of the first part and the second part. In addition, a connection area of the first part and the second part is relatively large, so that the connection between the first part and the second part is more secure, that is, the first part is not likely to detach from the second part.

In addition, in some cases, for a first part with a relatively small optical index (for example, a first part whose exit pupil area (also referred to as an eyebox) has a relatively small area, or a first part with a relatively small field of view (FOV)), the first part is assembled on the second part with the ring-shaped structure, so that areas of the first part in all directions can be significantly increased, thereby significantly increasing an area of the lens. In this case, the user has a relatively wide field of vision and relatively good visual comfort.

According to a second aspect, an embodiment of this application provides a lens disposed in a head-mounted display apparatus. The lens includes a first part and a second part. The first part is adjacent to the second part. A ratio of a transmittance of the second part to a transmittance of the first part is within a threshold range. The threshold range is from 0.5 to 1.5. The first part includes a free-form prism, a beam splitter, and a compensating prism that are sequentially stacked. The beam splitter is disposed between the free-form prism and the compensating prism. The free-form prism includes a first incident plane, a first exit plane, and a second incident plane. The first incident plane is adjacent to the beam splitter. The compensating prism is configured to receive ambient light, and the ambient light passes through the beam splitter, enters from the first incident plane of the free-form prism, and passes through the first exit plane. The second incident plane of the free-form prism is configured to receive display light emitted by a display module, and the beam splitter is configured to reflect, to the first exit plane, the display light received by the second incident plane. The second part is configured to transmit the ambient light.

In this embodiment, because the transmittance of the second part is relatively close to that of the first part, the brightness of a real world seen by a user through the second part is the same as or similar to that of a real world seen through the first part. Therefore, when the user moves his eyes from directly facing the first part to obliquely facing the second part, the user does not feel uncomfortable due to a large difference in brightness of received ambient light. The lens in this embodiment provides better user experience.

In an embodiment, the second part includes an optical lens and an anti-reflective film. It can be understood that the anti-reflective film is configured to reduce a permeability of the ambient light, so as to reduce the transmittance of the second part. The optical lens includes a first incident plane and a second exit plane that back each other. The anti-reflective film is located between the first incident plane and the second exit plane. The ambient light sequentially passes through the first incident plane and the anti-reflective film, and then exits from the second exit plane.

In this embodiment, the anti-reflective film is disposed between the first incident plane and the second exit plane to reduce the transmittance of the second part. The transmittance of the second part is close to that of the first part. In this case, when the user wears the head-mounted display apparatus, no large brightness difference appears between the first part and the second part of the lens.

In an embodiment, a first side surface of the first part is adjacent to a second side surface of the second part. A shape of a part, located on the first side surface, of the beam splitter is a first shape. A shape of a part, located on the second side surface, of the anti-reflective film is a second shape. The first shape matches the second shape. It can be understood that, when the first shape matches the second shape, the beam splitter and the anti-reflective film are connected to each other and are fitted into each other face to face. In this case, ambient light entering the second part through the first incident plane or ambient light entering the first part through the compensating prism can pass through the anti-reflective film or the beam splitter only once, that is, the ambient light does not pass through the anti-reflective film and the beam splitter at the same time, thereby ensuring that the brightness of regions of the entire lens is relatively uniform, that is, the entire lens has relatively good light transmission uniformity. This ensures that the user does not feel uncomfortable due to a large difference in brightness of received ambient light.

In an embodiment, the anti-reflective film is a plating layer formed, for example, by using a magnetron sputtering or vapor deposition process, between the first incident plane and the second exit plane. In this embodiment, a process of forming the anti-reflective film is simple and is easy to perform.

In an embodiment, the anti-reflective film includes one or more of a beam splitter, an absorbing film, or a polarizing film.

Because costs of the beam splitter, the absorbing film, or the polarizing film are relatively low, costs of the formed lens are also relatively low, that is, costs of the head-mounted display apparatus are also relatively low.

In an embodiment, the second part includes a substrate and a color masterbatch mixed in the substrate.

In this embodiment, a manner of fabricating the second part is simple and is easy to perform. In addition, transmittances of different regions of the second part are relatively uniform.

In an embodiment, the second part is a ring-shaped structure, the second part has an accommodation space, and the first part is disposed in the accommodation space. The second part is configured with a ring-shaped structure, thereby facilitating assembly of the first part and the second part. In addition, a connection area of the first part and the second part is relatively large, so that the connection between the first part and the second part is more secure, that is, the first part is not likely to detach from the second part.

BRIEF DESCRIPTION OF DRAWINGS

To describe the technical solutions in embodiments of this application, the following describes the accompanying drawings used in the embodiments of this application.

FIG. 15(a) is a schematic diagram of the lens from a perspective, and FIG. 15(b) is a schematic diagram of the lens from another perspective;

DESCRIPTION OF EMBODIMENTS

The following describes the embodiments of this application with reference to the accompanying drawings in the embodiments of this application.

Figure 1:
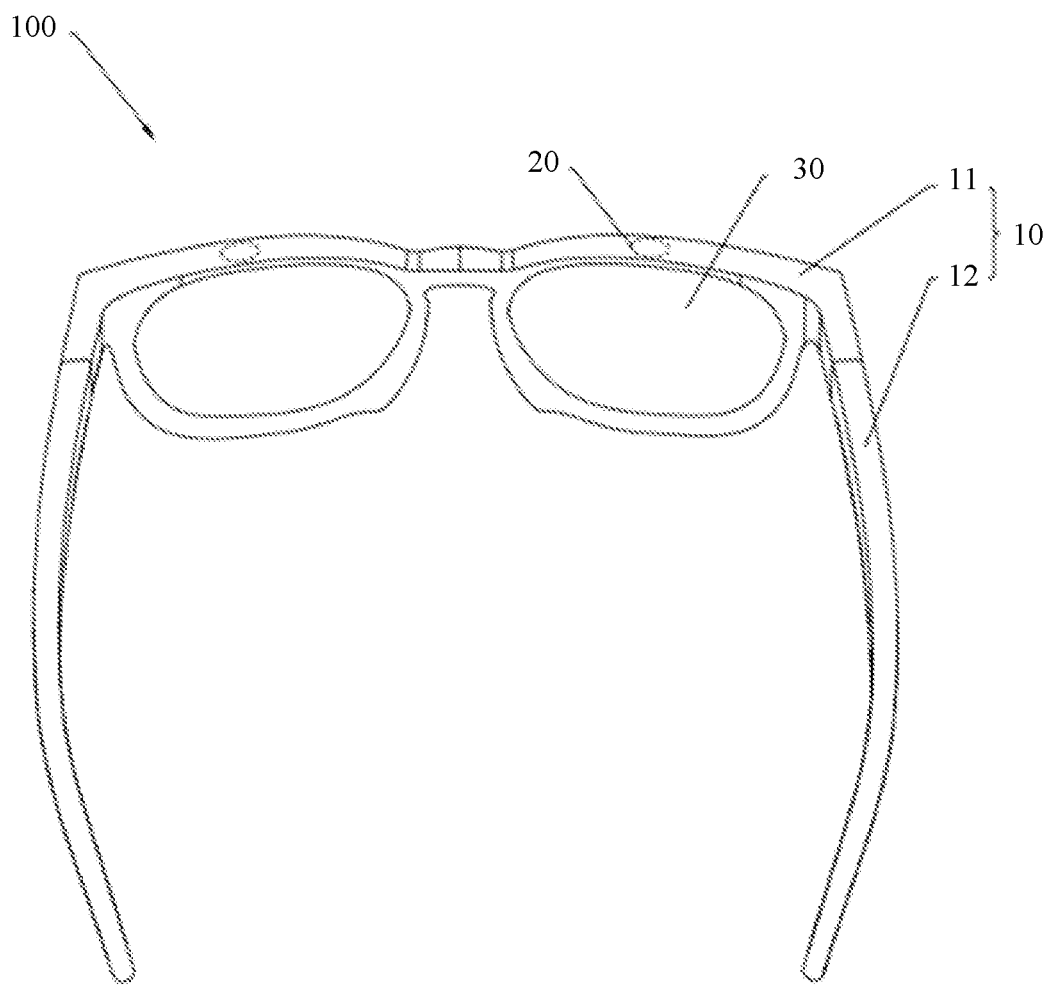
FIG. 1 is a schematic structural diagram of an implementation of a head-mounted display apparatus according to an embodiment of this application.

FIG. 1 is a schematic structural diagram of an implementation of a head-mounted display apparatus according to an embodiment of this application. The head-mounted display apparatus 100 may be augmented reality (AR) glasses or an AR helmet. The head-mounted display apparatus 100 in the embodiment shown in FIG. 1 is described by using AR glasses as an example.

As shown in FIG. 1, the head-mounted display apparatus 100 includes a lens frame 10, a display module 20, and a lens 30. Optionally, the lens frame 10 includes a frame 11 and legs 12. The frame 11 may include nose pads configured to be put on the nose of a user. In addition, the legs 12 are configured to be put on the ears of the user. In this case, when the user wears the head-mounted display apparatus 100 on his head, the head-mounted display apparatus 100 may be fixed on the head of the user by using the legs 13 and the nose pads.

In addition, there are two lenses 30. The two lenses 30 are both mounted on the lens frame 10. Specifically, the frame 11 is provided with two mounting holes. A shape of the mounting hole matches that of the lens 30. The two lenses 30 are mounted in the two mounting holes in a one-to-one correspondence. In this case, the user can see the real world through the two lenses 30. Certainly, in another embodiment, a quantity of lenses 30 is not limited. For example, there may be alternatively one lens 30, but a size of the lens 30 can cover both eyes of the user. In this case, the frame 11 is provided with one mounting hole. The lens 30 is directly mounted in the mounting hole. The user can see the real world directly through the lens 30 with both eyes.

In addition, there are two display modules 20. The display modules 20 may be mounted on the lens frame 10. Optionally, the display modules 20 may be disposed inside the frame 11, to effectively protect the display modules 20 by using the frame 11, and avoid damage caused by collision between the display modules 20 and an external article. Each display module 20 is disposed in correspondence with one lens 30. The two display modules 20 respectively provide virtual images for the two lenses 30. The virtual image may be, but is not limited to, a three-dimensional virtual image. Optionally, the display module 20 may be, but is not limited to, a display screen or a projector. In addition, the display module 20 may be a mini display module, for example, a mini display screen or a mini projector. Certainly, in another embodiment, there may be alternatively one display module 20. The display module 20 provides virtual images for the two lenses 30 through partitioning. In addition, the display module 20 may be wirelessly communicatively connected to an external device. In this case, the display module 20 can receive a virtual image provided by the external device, and provide the received virtual image to the user through the lens 30.

In this embodiment, the lens 30 can transmit display light emitted by the display module 20 to the eyes of the user, so that the user can see, by using the lens 30, a virtual image displayed by the display module 20. In addition, the lens 30 can transmit ambient light to the eyes of the user, so that the user can receive ambient light from the real world by using the lens 30, to see the real world. Therefore, the head-mounted display apparatus 100 in this embodiment can enable the user to see a combined image of a real image and a virtual image.

For example, the user can play a three-dimensional virtual reality game by using the head-mounted display apparatus 100. In this case, when the user wears the head-mounted display apparatus 100, the lens 30 transmits the real world as a background image to the eyes of the user. For example, the real world is a forest. In this case, the user sees an image of a forest. In addition, the display module 20 can provide a three-dimensional virtual image including a first virtual object and a second virtual object. For example, the first virtual object is a weapon, and the second virtual object is a character. In this case, the lens 30 transmits the first virtual object and the second virtual object provided by the display module 20 to the eyes of the user. In this case, the user sees an image of a forest with a virtual weapon and a virtual character.

Figure 2:
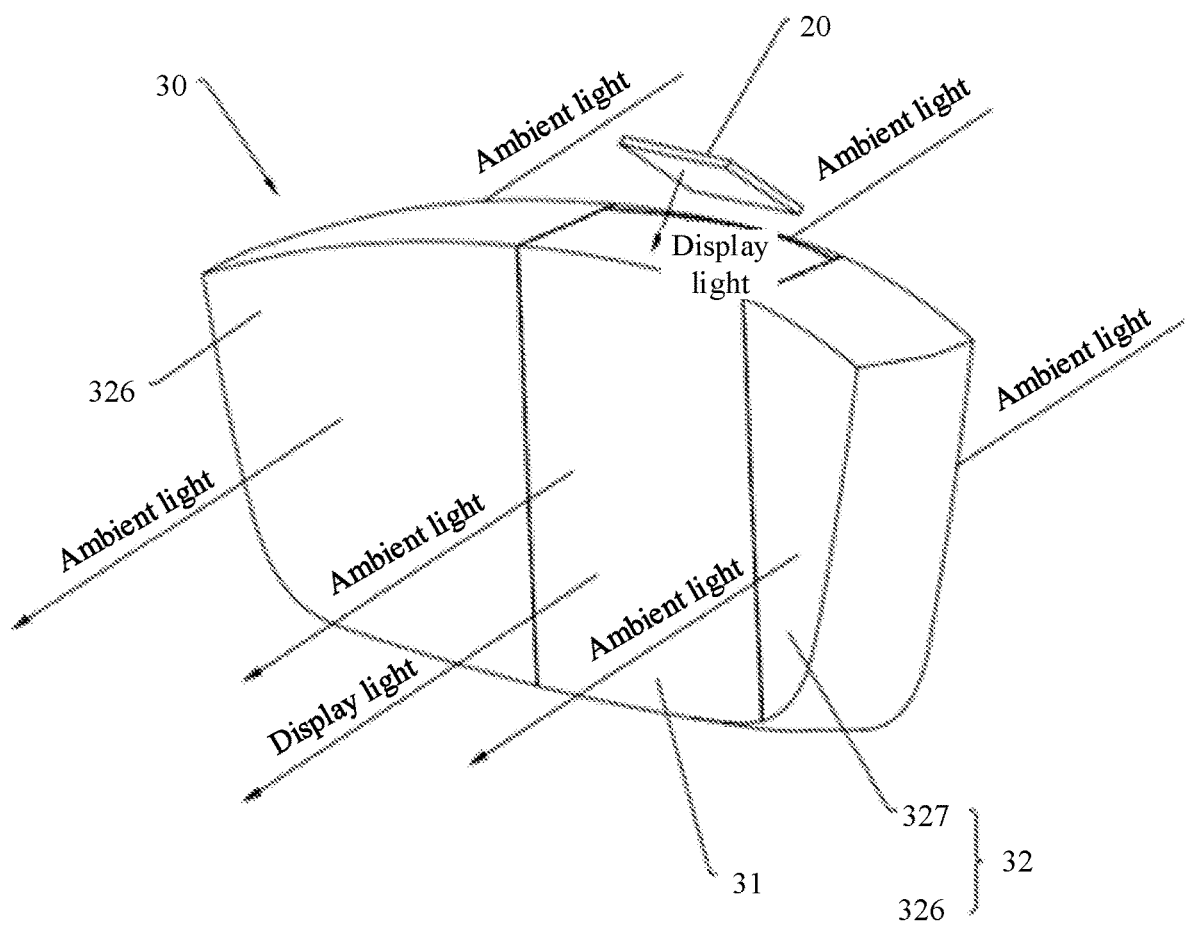
FIG. 2 is a schematic diagram of light paths of a display module and a lens of a head-mounted display apparatus shown in FIG. 1.

According to the foregoing descriptions, the user can see, by using the head-mounted display apparatus 100, a combined image of a real image and a virtual image. The following specifically describes the light propagation paths of a first part 31 and a second part 32 of the lens 30 with reference to FIG. 2. FIG. 2 is a schematic diagram of light paths of the display module 20 and the lens 30 of the head-mounted display apparatus 100 shown in FIG. 1.

As shown in FIG. 2, the lens 30 includes the first part 31 and the second part 32. The first part 31 is adjacent to the second part 32. To be specific, the second part 32 is located at a periphery of the first part 31. The periphery of the first part 31 is a region around the first part 31. In this case, the first part 31 can be effectively protected by the second part 32, to avoid damage to the first part 31. It can be understood that FIG. 2 illustrates that the second part 32 includes a first body part 326 and a second body part 327. The first body part 326 and the second body part 327 are respectively located on two sides of the first part 31. The first body part 326, the first part 31, and the second body part 327 are spliced into a continuous lens 30. However, a structure of the second part 32 is not limited to the structure shown in FIG. 2. For example, the structure of the second part 32 may be alternatively a structure shown in FIG. 12, FIG. 14, or FIG. 15(a) and FIG. 15(b). For specific descriptions, refer to the following descriptions.

In this embodiment, the second part 32 is disposed to include the first body part 326 and the second body part 327 that are separated, so that when the second part 32 is mounted on the first part 31, the first body part 326 and the second body part 327 may be mounted on two sides of the first part 31. In this case, a manner of assembling the lens 30 is relatively simple and is easy to perform.

As shown in FIG. 2, display light emitted by the display module 20 enters the eyes of the user after passing through/being transmitted through the first part 31. Ambient light may also enter the eyes of the user after passing through/being transmitted through the first part 31. Alternatively, ambient light may enter the eyes of the user after passing through/being transmitted through the second part 32, so that the user can see a real world through the second part 32. Therefore, the user can see a real world in a larger region through cooperation between the second part 32 and the first part 31, thereby improving comfort of viewing an outside world by the user. Certainly, the real world seen by the user through the first part 31 and the real world seen through the second part 32 may partially overlap.

Figure 3:
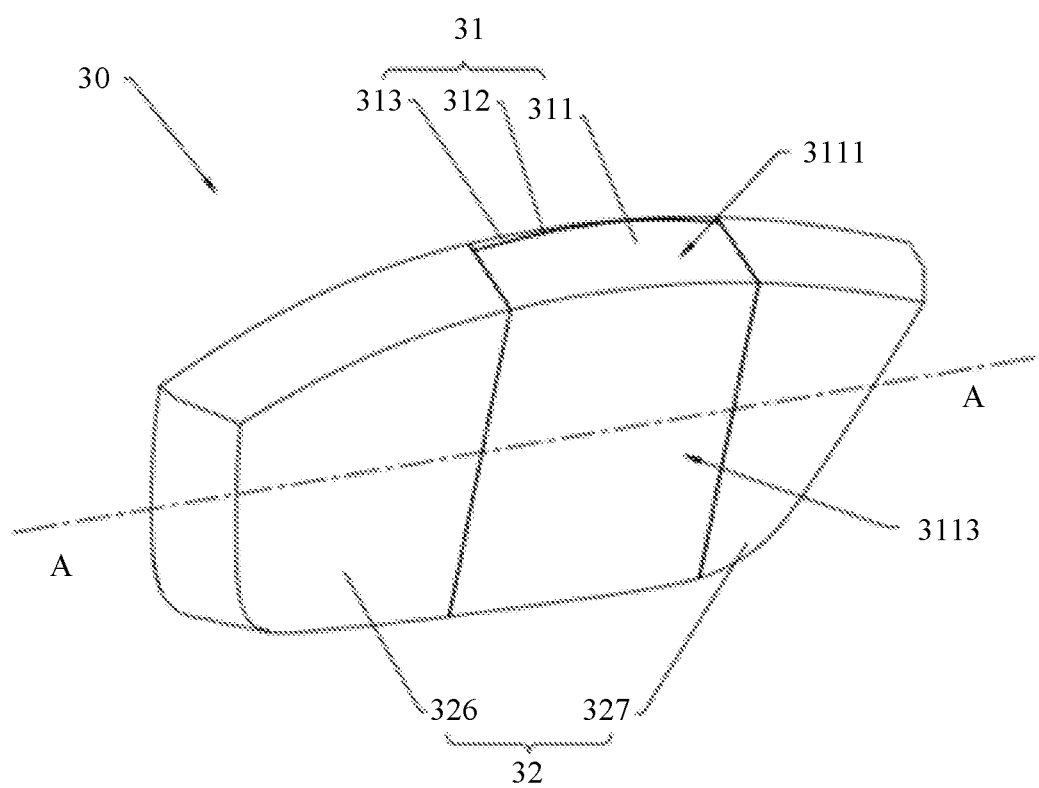
FIG. 3 is a schematic structural diagram of an implementation of a lens of a head-mounted display apparatus shown in FIG. 1.
Figure 4:
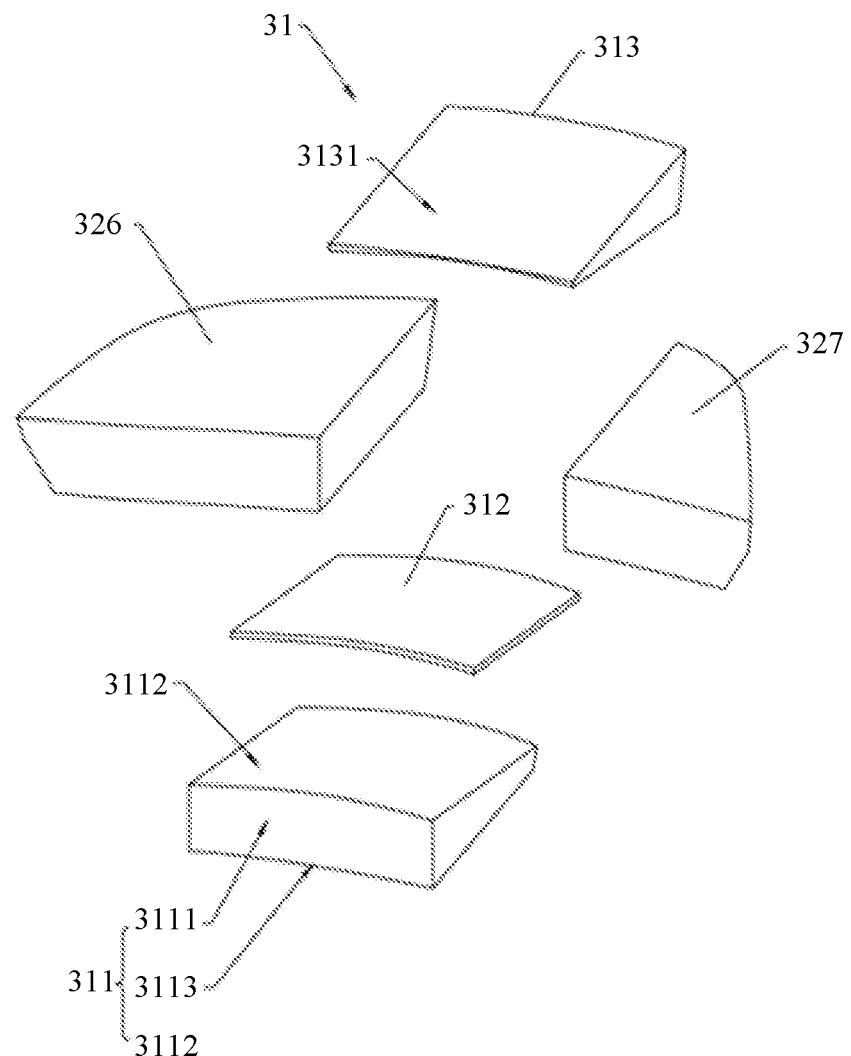
FIG. 4 is a schematic exploded view of a lens shown in FIG. 3 from a perspective.
Figure 5:
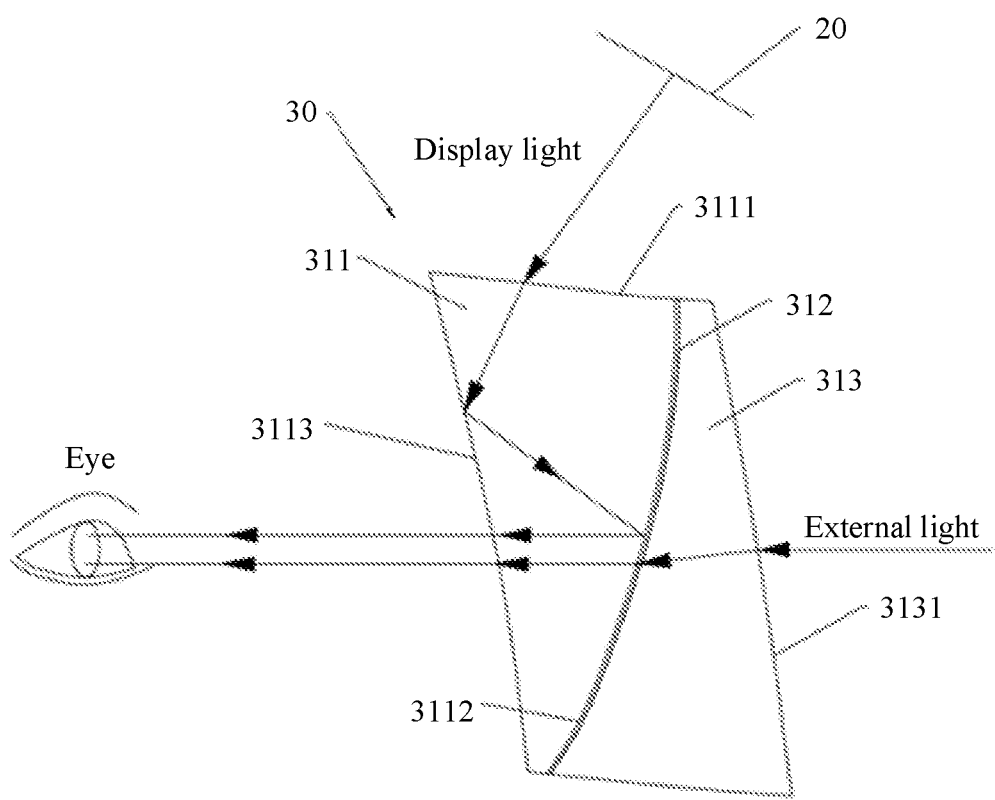
FIG. 5 is a schematic diagram of light paths when a lens shown in FIG. 3 cooperates with a display module.

The following describes an example structure of the first part 31 of the lens 30 and propagation paths of light (the light including display light and ambient light) in the first part 31 with reference to FIG. 3 to FIG. 5. FIG. 3 is a schematic structural diagram of an implementation of the lens 30 of the head-mounted display apparatus 100 shown in FIG. 1. FIG. 4 is a schematic exploded view of the lens 30 shown in FIG. 3 from a particular perspective. FIG. 5 is a schematic diagram of light paths of the first part of the lens shown in FIG. 3.

Referring to FIG. 3 and FIG. 4, the first part 31 includes a free-form prism 311, a beam splitter 312, and a compensating prism 313 that are sequentially stacked. The beam splitter 312 is located between the free-form prism 311 and the compensating prism 313. It can be understood that, when light (including ambient light and display light) propagates to the beam splitter 312, the beam splitter 312 can reflect half of the light and transmit half of the light. The free-form prism 311, the beam splitter 312, and the compensating prism 313 are located between the first body part 326 and the second body part 327.

As shown in FIG. 4 and with reference to FIG. 3, the free-form prism 311 includes a first incident plane 3112, a second incident plane 3111 (FIG. 3 illustrates the second incident plane 3111 from a different perspective), and a first exit plane 3113 (FIG. 3 illustrates the first exit plane 3113 from a different perspective). It can be understood that the first incident plane 3112 and the first exit plane 3113 are opposite to each other. The second incident plane 3111 is located between the first incident plane 3112 and the first exit plane 3113. The first incident plane 3112 is adjacent to the beam splitter 312, that is, the beam splitter 312 is located between the first incident plane 3112 and the compensating prism 313. It can be understood that, when the user wears the head-mounted display apparatus 100, the first exit plane 3113 faces the eyes of the user, that is, the eyes of the user receive light that exits from the first exit plane 3113. It can be understood that the beam splitter 312 is configured to reflect display light received by the second incident plane 3111 to the first exit plane 3113. The beam splitter 312 is further configured to transmit ambient light that enters from the compensating prism 313 to the first incident plane 3112.

As shown in FIG. 4, the compensating prism 313 has a third incident plane 3131. The third incident plane 3131 is a surface of the compensating prism 313 that is opposite to the beam splitter 312. Ambient light enters the compensating prism 313 through the third incident plane 3131. Further, the first incident plane 3112 is configured to enable the ambient light that enters the compensating prism 313 to enter the free-form prism 311. The second incident plane 3111 is configured to receive display light emitted by the display module 20 (refer to FIG. 2), that is, enable the display light emitted by the display module 20 (refer to FIG. 2) to enter the free-form prism 311. The first exit plane 3113 is configured to enable the display light and the ambient light that enter the free-form prism 311 to exit from the free-form prism 311. Specifically, light transmission paths of the first part 31 are specifically described below with reference to FIG. 5.

In referring to FIG. 5, after the display module 20 emits the display light, the display light enters the free-form prism 311 through the second incident plane 3111. In this case, a part of the display light propagates to the beam splitter 312 through total reflection by the first exit plane 3113. This part of display light is then reflected by the beam splitter 312, exits from the first exit plane 3113, and is projected to the eyes of the user. In this case, the user can receive a virtual image transmitted by the display module 20. In addition, ambient light enters the compensating prism 313 through the third incident plane 3131 of the compensating prism 313. In this case, the ambient light is sequentially transmitted through the compensating prism 313 and the beam splitter 312 and propagates to the first incident plane 3112, and enters the free-form prism 311 through the first incident plane 3112. The ambient light that enters the free-form prism 311 exits from the first exit plane 3113, and is projected to the eyes of the user. In this case, the user can receive the ambient light, that is, the user can see a real world. Therefore, the user can see, through the first part 31, a composite image that combines a real image with a virtual image.

Figure 6:
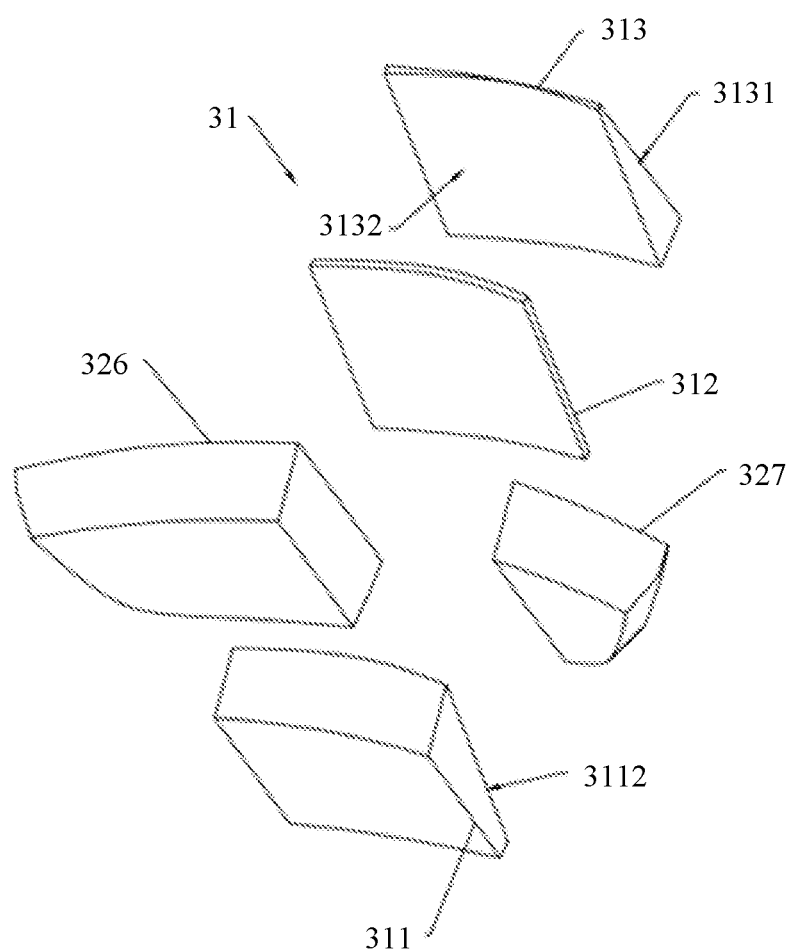
FIG. 6 is a schematic exploded view of a lens shown in FIG. 3 from another perspective.

The foregoing specifically describes an example structure of the first part 31 and the propagation paths of the light in the first part 31. The following describes several implementations of a location relationship and a connection relationship between the structures of the first part 31 with reference to FIG. 4 and FIG. 6. FIG. 6 is a schematic exploded view of the lens 30 shown in FIG. 3 from another perspective.

As shown in FIG. 4, the shapes of the third incident plane 3131 and the first exit plane 3113 (FIG. 3 illustrates the first exit plane 3113 from a different perspective) may be the same. It can be understood that, because the shapes of the first incident plane 3112 and the first exit plane 3113 of the free-form prism 311 are different, the ambient light is distorted when the ambient light enters the free-form prism 311 from the first incident plane 3112 and exits from the first exit plane 3113. In this case, the compensating prism 313 is disposed on the first incident plane 3112, and a shape of the third incident plane 3131 of the compensating prism 313 may be the same as that of the first exit plane 3113 of the free-form prism 311, so that the ambient light that enters the compensating prism 313 from the third incident plane 3131 and exits the free-form prism 311 from the first incident plane 3113 is not distorted. Certainly, when variations due to processing technique are taken into consideration, the shapes of the third incident plane 3131 and the first exit plane 3113 may be slightly different, that is, approximately the same.

In an implementation, a refractive index of the compensating prism 313 is the same as that of the free-form prism 311. In this case, when ambient light passes through the compensating prism 313 and the free-form prism 311, because the refractive index of the compensating prism 313 is the same as that of the free-form prism 311, refractive changes of the ambient light in the compensating prism 313 and the free-form prism 311 are uniform. In this case, when the ambient light is projected to the eyes of the user, no image displacement occurs in the real world image presented to the eyes of the user. Therefore, comfort of viewing the real world by the user through the lens 30 is relatively good.

In an implementation, the beam splitter 312 is stacked on the first incident plane 3112. The compensating prism 313 is fixed to the beam splitter 312 by an optically clear adhesive. It can be understood that the optically clear adhesive can fill a gap between the compensating prism 313 and the beam splitter 312. To be specific, the optically clear adhesive can counteract tolerances that exist during production or fixing of the compensating prism 313 and the beam splitter 312. Therefore, the first part 31 has relatively high integrity, and further, the first part 31 has relatively good appearance. To be specific, the user does not see a gap in the first part 31. Certainly, in another embodiment, the beam splitter 312 is stacked on the compensating prism 313. In this case, the free-form prism 311 is fixed to the beam splitter 312 by using an optically clear adhesive.

In addition, a refractive index of the optically clear adhesive is the same as that of the compensating prism 313. When ambient light passes through the compensating prism 313 and the optically clear adhesive, because the refractive index of the optically clear adhesive is the same as that of the compensating prism 313, refractive changes of the ambient light in the compensating prism 313 and the optically clear adhesive are uniform. In this case, when the ambient light is projected to the eyes of the user, no image displacement occurs in the real world image presented to the eyes of the user. Therefore, comfort of viewing the real world by the user through the lens 30 is relatively good.

In addition, because the refractive index of the optically clear adhesive is the same as that of the compensating prism 313, the optically clear adhesive and the compensating prism 313 are integrated as one component. In this case, no obvious connection surface or connection line appears at a junction between the optically clear adhesive and the compensating prism 313, thereby ensuring a relatively good appearance of the first part 31. To be specific, when the user looks at the first part 31, no obvious connection surface or connection line appears in the first part 31.

As shown in FIG. 6, the compensating prism 313 includes a third exit plane 3132. The third exit plane 3132 is a surface of the compensating prism 313 that faces the free-form prism 311. The third exit plane 3132 and the third incident plane 3131 (refer to FIG. 4) are opposite to each other. The shapes of the third exit plane 3132 and the first incident plane 3112 (FIG. 4 illustrates the first incident plane 3112 from different perspectives) may be the same. It can be understood that, if the third exit plane 3132 of the compensating prism 313 is directly attached to the first incident plane 3112 of the free-form prism 311, no large gap appears between the third exit plane 3132 and the first incident plane 3112, that is, the third exit plane 3132 and the first incident plane 3112 can be well fitted face to face. In this case, when the beam splitter 312 is disposed between the free-form prism 311 and the compensating prism 313, because no large gap appears between the third exit plane 3132 and the first incident plane 3112, a thickness of the beam splitter 312 does not need to be increased at a relatively large gap to fill the gap. Therefore, the thickness of the beam splitter 312 in this embodiment is relatively uniform. In this case, the brightness of ambient light that passes through the beam splitter 312 is also relatively uniform, that is, brightness of ambient light that passes through the first part 31 is also relatively uniform. Certainly, when processing technique variations are taken into consideration, the shapes of the third exit plane 3132 and the first incident plane 3112 may be slightly different, that is, approximately the same.

In addition, because no large gap appears between the third exit plane 3132 and the first incident plane 3112, a propagation direction of ambient light does not change greatly due to the gap. Therefore, when the user views a real world through the first part 31, an image seen by the user does not change greatly or abruptly. In this case, visual comfort of the user is relatively good.

The foregoing describes the propagation paths of the light in the first part 31. It can be understood that, when the beam splitter 312 is disposed in the first part 31, the beam splitter 312 reflects a part of the ambient light. In this case, the brightness of a real world image seen by the user through the first part 31 is relatively low. However, the second part 32 can allow most of the ambient light to pass. In this case, the brightness of a real world image seen by the user through the second part 32 is relatively high. In this case, when the eyes of the user are shifted from a location of the first part 31 to a location of the second part 32, ambient light received by the user has a relatively large difference in brightness, thereby causing discomfort to the user. In this embodiment, a ratio of a transmittance of the second part 32 to a transmittance of the first part 31 is set within a threshold range. For example, the threshold range is from 0.5 to 1.5, so that the transmittance of the second part 32 is relatively close to that of the first part 31. In this case, when the eyes of the user are shifted from the location of the first part 31 to the location of the second part 32, the user does not feel uncomfortable due to a large difference in brightness of received ambient light. Therefore, the head-mounted display apparatus 100 in this embodiment provides better user experience. It can be understood that the threshold range is a preset range.

In addition, because different regions of the lens 30 have a relatively small difference in brightness, quality of an image displayed by the head-mounted display apparatus 100 is relatively good.

For another example, the threshold range is 0.9 to 1.1. A transmittance of the entire lens 30 is approximately uniform. In this case, the brightness of an entire region of the lens 30 seen by the user is approximately uniform. Therefore, when the eyes of the user are shifted from the location of the first part 31 to the location of the second part 32, the user does not feel uncomfortable due to a large difference in brightness of received ambient light.

The following describes two embodiments of reducing the transmittance of the second part 32 with reference to FIG. 7 to FIG. 11.

In a first embodiment, an anti-reflective film 322 is disposed in the second part 32 to reduce the transmittance of the second part 32. In this embodiment, the anti-reflective film 322 may be formed in two implementations. In a first implementation, the anti-reflective film 322 is a plating layer formed, through magnetron sputtering or vapor deposition, between a first incident plane 3211 and a second exit plane 3212. In a second implementation, the anti-reflective film 322 is one or more of a beam splitter, an absorbing film, or a polarizing film.

In a second embodiment, a color masterbatch 324 is disposed in a substrate 323 of the second part 32 to reduce the transmittance of the second part 32.

Figure 7:
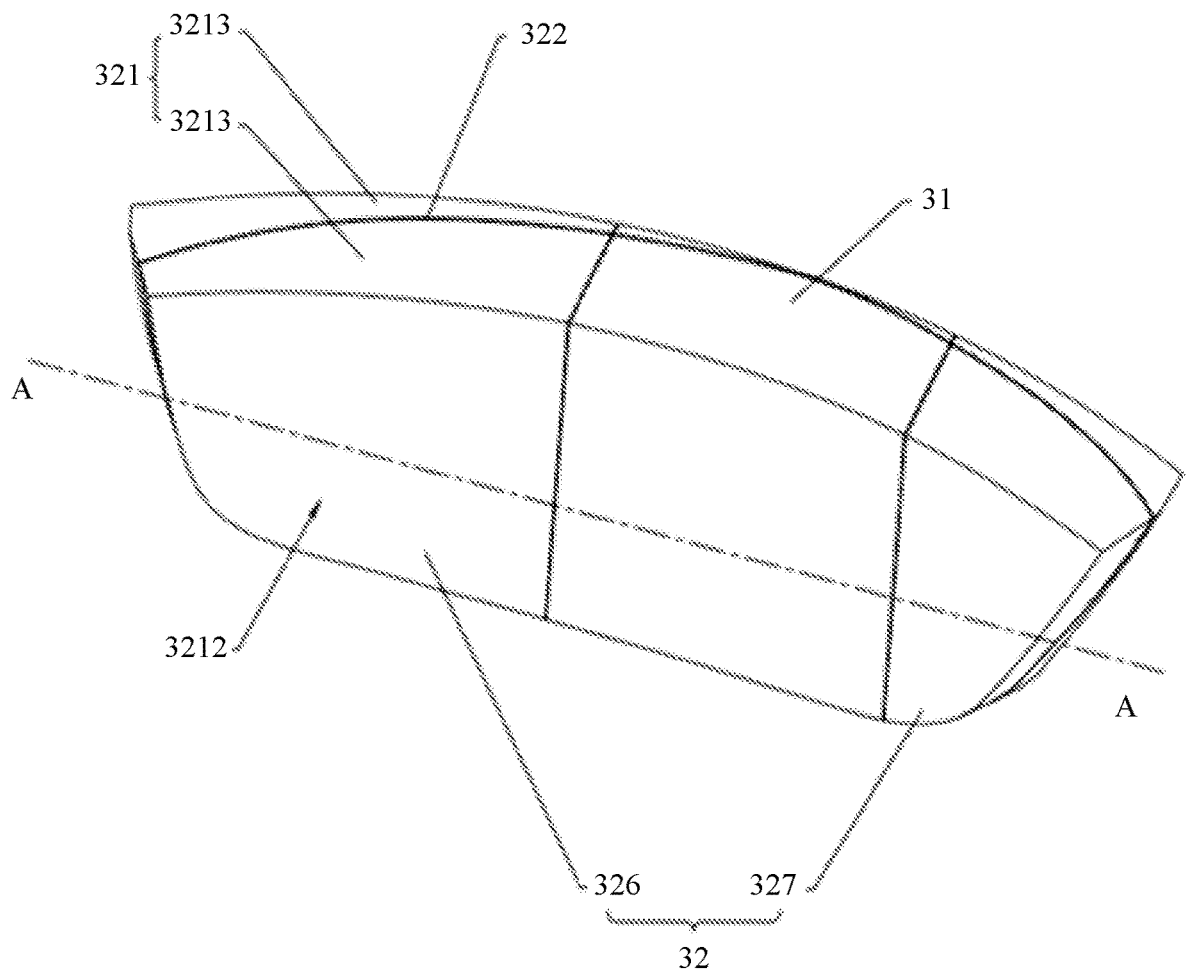
FIG. 7 is a schematic structural diagram of another implementation of a lens of a head-mounted display apparatus shown in FIG. 1.
Figure 8A:
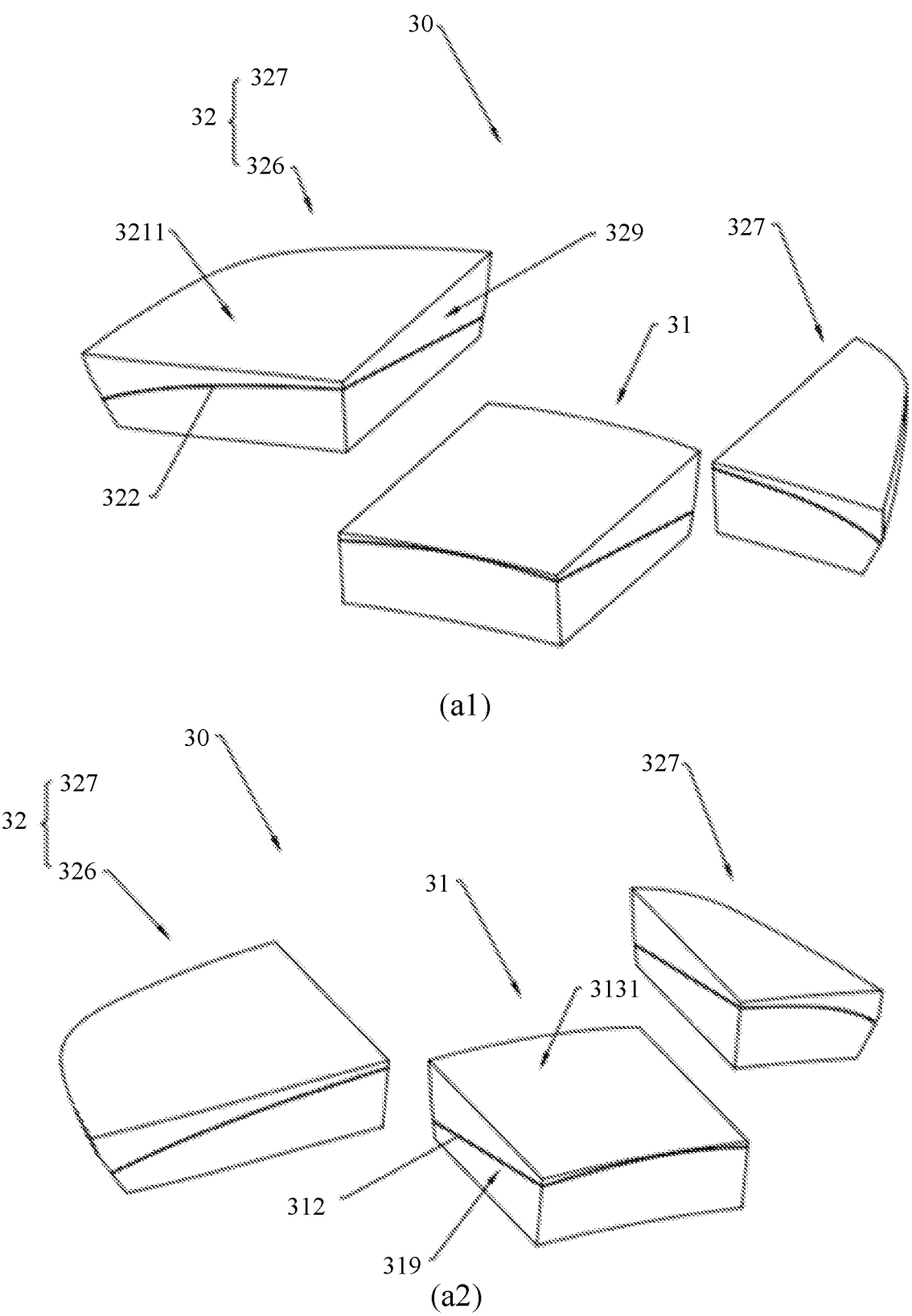
FIG. 8(a) is a partial schematic exploded view of a lens shown in FIG. 7, where (a1) is a schematic exploded view from a perspective, and (a2) is a schematic exploded view from another perspective.
Figure 8B:
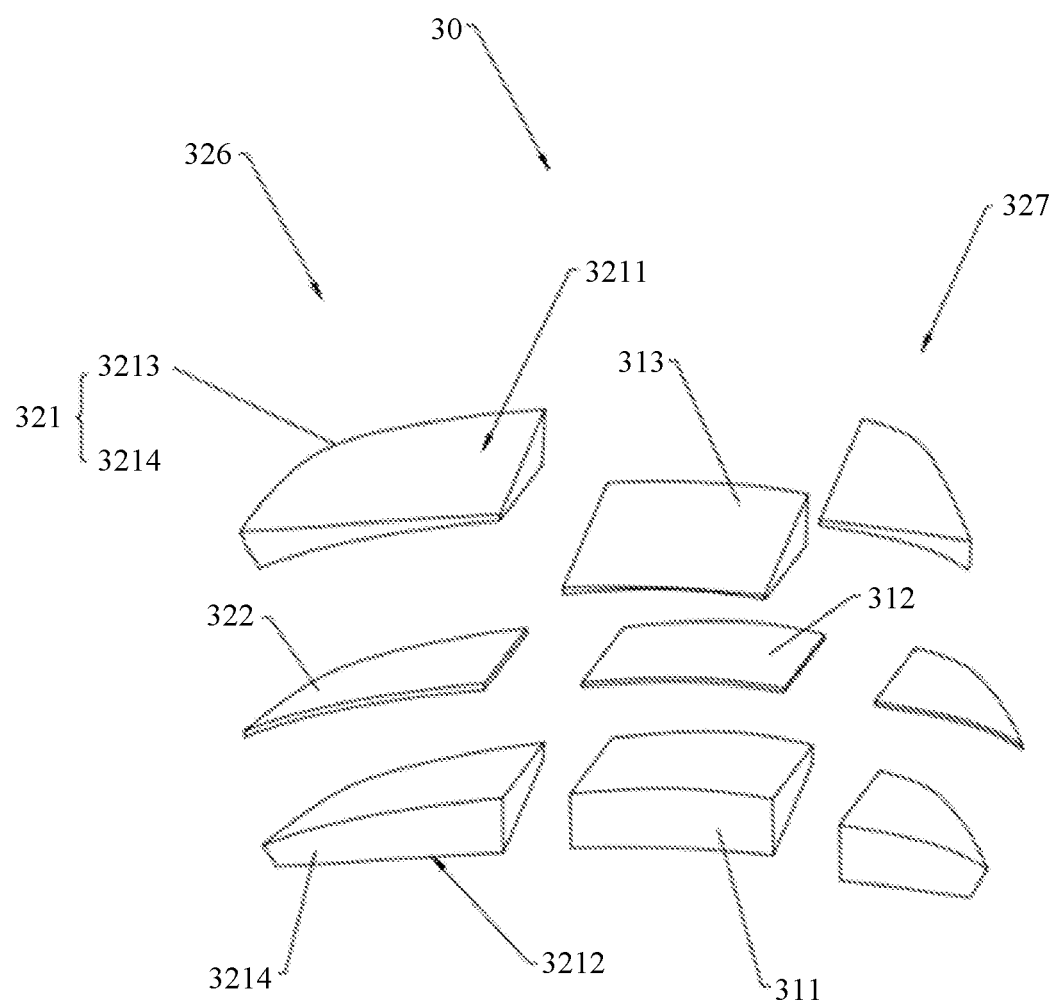
FIG. 8(b) is a schematic exploded view of a lens shown in FIG. 7.
Figure 9:
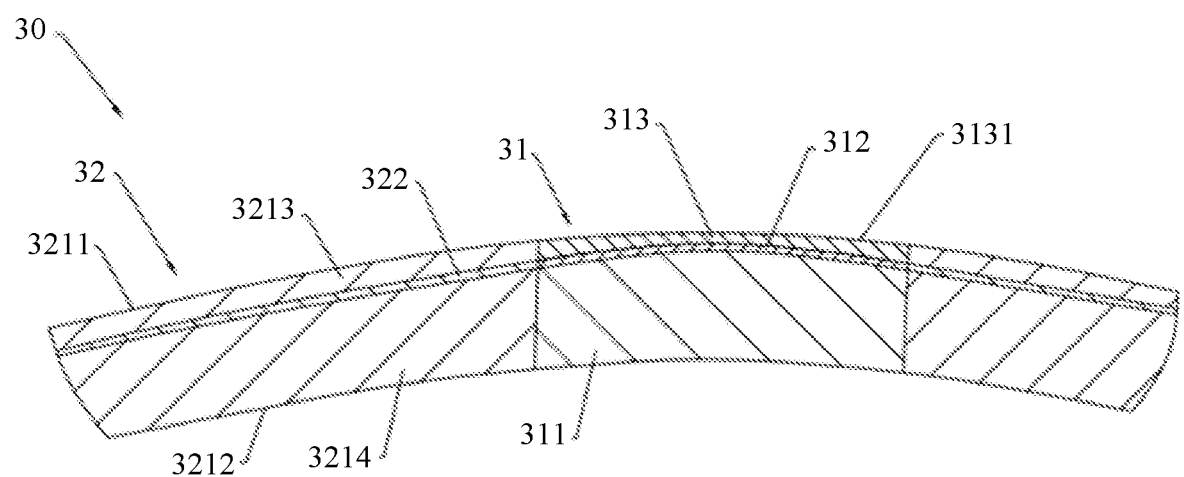
FIG. 9 is a schematic cross-sectional view of a lens shown in FIG. 7 at a line A-A.

First, the first embodiment is specifically described with reference to FIG. 7 to FIG. 9. The anti-reflective film 322 is disposed in the second part 32 to reduce the transmittance of the second part 32, so as to improve quality of an image displayed by the head-mounted display apparatus 100. FIG. 7 is a schematic structural diagram of another implementation of the lens 30 of the head-mounted display apparatus 100 shown in FIG. 1. FIG. 8(a) is a partial schematic exploded view of the lens 30 shown in FIG. 7. (a1) is a schematic exploded view from a particular perspective, and (a2) is a schematic exploded view from another perspective. FIG. 8(b) is a schematic exploded view of the lens 30 shown in FIG. 7. FIG. 9 is a schematic cross-sectional view of the lens 30 shown in FIG. 7 at a line A-A.

As shown in FIG. 7, the second part 32 includes an optical lens 321 and the anti-reflective film 322. The optical lens 321 may allow most of ambient light to pass.

In this embodiment, as shown in FIG. 8(a) and FIG. 8(b), the first part 31 is located between the first body part 326 and the second body part 327. In addition, the first body part 326 is used as an example for description, that is, the first body part 326 includes the optical lens 321 and the anti-reflective film 322. The anti-reflective film 322 is configured to reduce a permeability of ambient light, so as to reduce the transmittance of the second part 32. In addition, the second body part 327 may also include an optical lens and an anti-reflective film. For related disposition of the optical lens and the anti-reflective film of the second body part 327, refer to the first body part 326. Details are not described below again.

As shown in FIG. 8(b), the optical lens 321 includes the first incident plane 3211 and the second exit plane 3212 (FIG. 7 illustrates the second exit plane 3212 from another perspective) that are opposite to each other. The first incident plane 3211 is configured to enable ambient light to enter the optical lens 321. The second exit plane 3212 is configured to enable the ambient light that enters the optical lens 321 to exit. It can be understood that, when the user wears the head-mounted display apparatus 100, the second exit plane 3212 faces the eyes of the user. In this case, when ambient light enters the optical lens 321 through the first incident plane 3211, the ambient light passes through the anti-reflective film 322, and exits from the optical lens 321 through the second exit plane 3212. The ambient light that exits from the optical lens 321 is projected onto the eyes of the user.

In this embodiment, the anti-reflective film 322 is disposed between the first incident plane 3211 and the second exit plane 3212 to reduce a transmittance of the first body part 326, so that the transmittance of the first body part 326 is close to that of the first part 31. In this case, when the user wears the head-mounted display apparatus 100, no large brightness difference occurs between the first part 31 and the second part 32 of the lens 30. To be specific, brightness of a real world seen by the user through the second part 32 is approximately the same as that of a real world seen through the first part 31. Therefore, when the eyes of the user are shifted from directly facing the first part 31 to obliquely facing the second part 32, the user does not feel uncomfortable due to a large difference in brightness of received ambient light, thereby improving user experience of the head-mounted display apparatus 100 in this embodiment.

Optionally, a refractive index of the optical lens 321 is the same as that of the compensating prism 313. For example, the optical lens 321 and the compensating prism 313 are made of a same material. In this case, when ambient light passes through the first part 31 and the second part 32, because the refractive index of the optical lens 321 is the same as that of the compensating prism 313, refractive changes of the ambient light in the first part 31 and the second part 32 are uniform. In this case, when the ambient light is projected onto the eyes of the user, no image displacement occurs in the real world image presented to the eyes of the user. Therefore, the comfort of viewing the real world by the user through the lens 30 is relatively good.

Still referring to FIG. 8(b), the optical lens 321 includes a first light transmission part 3213 and a second light transmission part 3214 that face each other. In this embodiment, the first body part 326 is used as an example for description. In this case, the first body part 326 includes the first light transmission part 3213 and the second light transmission part 3214 that face each other. The anti-reflective film 322 is disposed between the first light transmission part 3213 and the second light transmission part 3214. In addition, for the second body part 327, refer to the structural layout of the first body part 326. Details are not described herein again.

In addition, a surface of the first light transmission part 3213 that is away from the second light transmission part 3214 is the first incident plane 3211. A surface of the second light transmission part 3214 that is away from the first light transmission part 3213 is the second exit plane 3212.

In this embodiment, the optical lens 321 is disposed to include the first light transmission part 3213 and the second light transmission part 3214. Therefore, in a process of disposing the anti-reflective film 322 on the optical lens 321, the anti-reflective film 322 may be disposed on one of the first light transmission part 3213 or the second light transmission part 3214 first, and then the other one of the first light transmission part 3213 or the second light transmission part 3214 may be affixed to the anti-reflective film 322. In this embodiment, a process of mounting the anti-reflective film 322 is relatively simple and is easy to perform.

In another embodiment, the optical lens 321 may be alternatively in an integral structure. In this case, the anti-reflective film 322 is disposed in the optical lens 321. For example, the optical lens 321 is formed by using an injection molding process. Specifically, a part of the optical lens 321 is formed first. After cooling and molding, the anti-reflective film 322 is affixed to the part. Finally, the other part of the optical lens 321 is formed by using the injection molding process. After the other part of the optical lens 321 is cooled and molded, the second part 32 is formed. In this case, the anti-reflective film 322 and the optical lens 321 are integrated as one piece, that is, the second part 32 has relatively high integrity.

In an embodiment, referring to FIG. 8(a), a first side surface 319 of the first part 31 is adjacent to a second side surface 329 of the second part 32. A shape of a part, located on the first side surface 319, of the beam splitter 312 is a first shape. A shape of a part, located on the second side surface 329, of the anti-reflective film 322 is a second shape. The first shape matches the second shape. It can be understood that, when the first shape matches the second shape, the beam splitter 312 and the anti-reflective film 322 are connected to each other and are attached to each other face to face. In this case, ambient light entering the second part 32 through the first incident plane 3211 or ambient light entering the first part 31 through the third incident plane 3131 can pass through the anti-reflective film 322 or the beam splitter 312 only once, that is, the ambient light does not pass through the anti-reflective film 322 and the beam splitter 312 at the same time, thereby ensuring that brightness of different regions of the entire lens 30 is relatively uniform (it can be understood that, when the ambient light passes through a location on the anti-reflective film 322 or the beam splitter 312 more than once, brightness at the location is also reduced more than once, and in this case, brightness of the first part 31 or the second part 32 is not uniform). Therefore, the entire lens 30 in this embodiment has relatively good light transmission uniformity, thereby ensuring that the user does not feel uncomfortable due to a large difference in brightness of received ambient light.

In an embodiment shown in FIG. 9, an edge of the anti-reflective film 322 is connected to an edge of the beam splitter 312. In this case, the first light transmission part 3213 is connected to the compensating prism 313, and the second light transmission part 3214 is connected to the free-form prism 311.

It can be understood that the anti-reflective film 322 and the beam splitter 312 are spliced into a continuous film layer. In this case, ambient light entering the second part 32 through the first incident plane 3211 or ambient light entering the first part 31 through the third incident plane 3131 can pass through the anti-reflective film 322 or the beam splitter 312 only once, that is, the ambient light does not pass through the anti-reflective film 322 and the beam splitter 312 at the same time, thereby ensuring that the brightness of different regions of the entire lens 30 is relatively uniform. Therefore, the entire lens 30 in this embodiment has relatively good light transmission uniformity, thereby ensuring that the user does not feel uncomfortable due to a large difference in brightness of received ambient light.

Optionally, the anti-reflective film 322 is smoothly connected to the beam splitter 312. In this case, because no abrupt convex or concave region appears at the junction between the anti-reflective film 322 and the beam splitter 312, a propagation direction of ambient light that passes through the junction between the anti-reflective film 322 and the beam splitter 312, and a propagation direction of ambient light that passes through the anti-reflective film 322 or the beam splitter 312 are not much different. Therefore, when the eyes of the user are shifted from the location of the first part 31 to the location of the second part 32, a real world image seen by the user does not change greatly or abruptly. In this case, visual comfort of the user is relatively good.

Optionally, the first incident plane 3211 is smoothly connected to the third incident plane 3131 of the compensating prism 313. In this case, no abrupt convex or concave region appears at a junction between the first incident plane 3211 and the third incident plane 3131 of the compensating prism 313. Therefore, the first incident plane 3211 of the lens 30 and the third incident plane 3131 are relatively smooth, that is, the lens 30 has a more appealing appearance. In addition, because no abrupt convex or concave region appears at the junction between the first incident plane 3211 and the third incident plane 3131, a propagation direction of ambient light that enters the lens 30 through the junction between the first incident plane 3211 and the third incident plane 3131, and a propagation direction of ambient light that passes through the first incident plane 3211 and the third incident plane 3131 are not perceptively different. Therefore, when the eyes of the user are shifted from the location of the first part 31 to the location of the second part 32, a real world image seen by the user does not change greatly or abruptly. In this case, visual comfort of the user is relatively good.

The following describes example structures of the anti-reflective film 322 in two implementations.

In the first implementation, the anti-reflective film 322 is a plating layer formed, by using a magnetron sputtering or vapor deposition process, between the first incident plane 3211 and the second exit plane 3212.

Specifically, a plating layer is formed, through magnetron sputtering or vapor deposition, on a surface of the first light transmission part 3213 that faces the second light transmission part 3214. Then the second light transmission part 3214 is bonded to the plating layer by using an optically clear adhesive. In this case, the plating layer formed between the first light transmission part 3213 and the second light transmission part 3214 is the anti-reflective film 322. The formed plating layer can reduce ambient light that passes through the optical lens 321, that is, the transmittance of the second part 32 is reduced. In another embodiment, the plating layer may be alternatively formed, through magnetron sputtering or vapor deposition, on a surface of the second light transmission part 3214 that faces the first light transmission part 3213.

Optionally, the plating layer includes a first plating sub-layer and a second plating sub-layer laminated on the first plating sub-layer. The material of the first plating sub-layer includes silicon dioxide or magnesium fluoride. The material of the second plating sub-layer includes one of titanium oxide, neodymium oxide or zirconia. Because plating sub-layers made of different materials have different transmittances, a transmittance of the anti-reflective film 322 can be accurately controlled by laminating a plurality of plating sub-layers to form the anti-reflective film 322.

Optionally, a thickness range of the first plating sub-layer is within a range of 70 nm to 100 nm. A thickness range of the second plating sub-layer is within a range of 2.5 nm to 60 nm. In this case, the plating layer is relatively thin, thereby facilitating thinning of the lens 30.

Optionally, the plating layer is planar. In this case, the plating layer has better thickness uniformity, and a difficulty for processing the plating layer is relatively low. In another implementation, the plating layer may be curved. In this case, when the plating layer is connected to the beam splitter 312, the plating layer and the beam splitter 312 may be spliced into a continuous curved surface.

In the second implementation, the anti-reflective film 322 includes one or more of a beam splitter, an absorbing film, or a polarizing film.

In this implementation, the one or more of the beam splitter, the absorbing film, or the polarizing film is directly disposed between the first light transmission part 3213 and the second light transmission part 3214. Because the costs of the beam splitter, the absorbing film, or the polarizing film are relatively low, the costs of the formed lens 30 are also relatively low, that is, the costs of the head-mounted display apparatus 100 are also relatively low.

Optionally, the one or more of the beam splitter, the absorbing film, or the polarizing film is affixed between the first light transmission part 3213 and the second light transmission part 3214 by using an optically clear adhesive.

In addition, when the anti-reflective film 322 is a beam splitter, the anti-reflective film 322 of the second part 32 and the beam splitter 312 of the first part 31 are made of a same material. In this case, the light intensity of ambient light passing through the anti-reflective film 322 is relatively close to that of ambient light passing through the beam splitter 312. In this case, the transmittance of the first part 31 is largely close to that of the second part 32. Further, a thickness of the anti-reflective film 322 is the same as that of the beam splitter 312 of the first part 31. In this case, light intensity of ambient light passing through the anti-reflective film 322 is the same as that of ambient light passing through the beam splitter 312.

In addition, an absorbing film is a film capable of absorbing a part of ambient light. When the anti-reflective film 322 is an absorbing film, it may absorb a part of ambient light that enters the optical lens 321, thereby reducing the light intensity of ambient light that enters the second part 32. In this embodiment, an absorbing film with a specific absorptivity may be selected based on a magnitude of the transmittance of the first part 31. For example, the transmittance of the first part 31 is 50%. In this case, an absorbing film with an absorptivity of 50% may serve as the anti-reflective film 322.

In addition, a polarizing film is a film that allows a part of polarized light to pass. When the anti-reflective film 322 is a polarizing film, it may allow a part of ambient light that enters the optical lens 321 to pass, thereby reducing the intensity of ambient light that enters 32. For the polarizing film in this embodiment, a corresponding polarizing film may be alternatively selected based on a magnitude of the transmittance of the first part 31.

Optionally, the anti-reflective film 322 is a single-layer film. For example, the anti-reflective film 322 is one of a beam splitter, an absorbing film, or a polarizing film.

In some cases, the anti-reflective film 322 may alternatively be a multi-layer film. For example, the anti-reflective film 322 includes a beam splitter and an absorbing film that are stacked, or an absorbing film and a polarizing film that are stacked. Because different types of film layers have different transmittances, the anti-reflective film 322 may be constructed as a multi-layer film, so that the transmittance of the second part 32 can be controlled more flexibly, and the transmittance of the second part 32 is more likely to be close to that of the first part 31.

Figure 10:
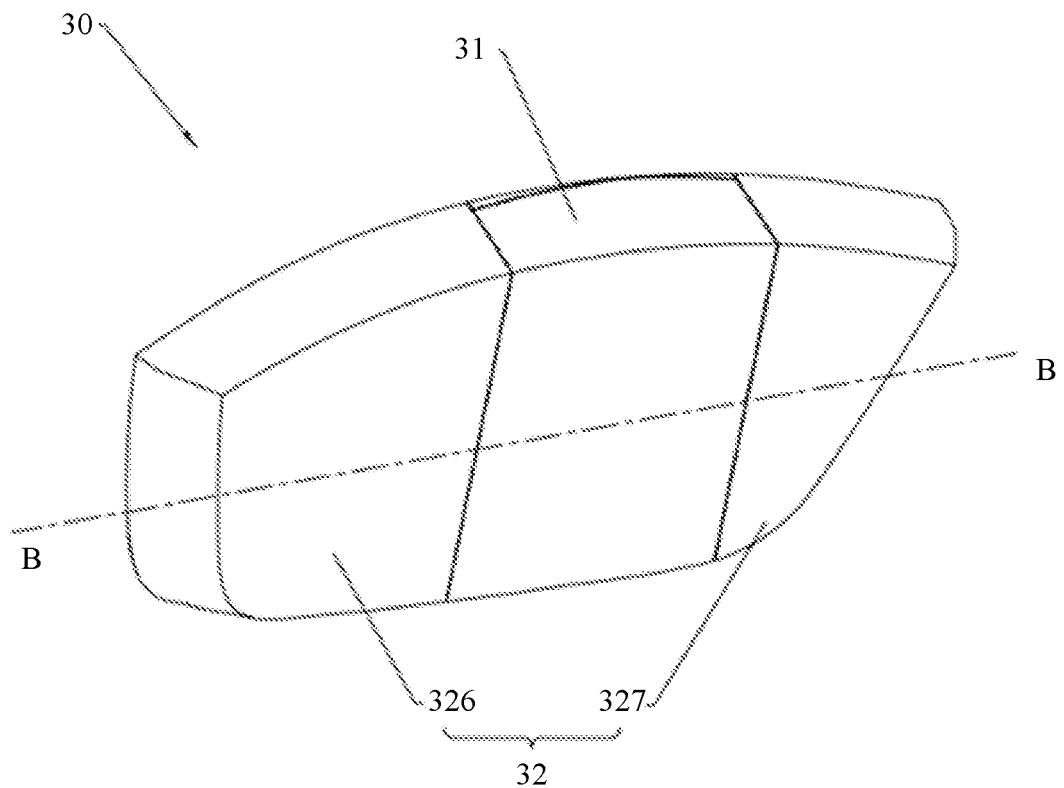
FIG. 10 is a schematic structural diagram of still another implementation of a lens of a head-mounted display apparatus shown in FIG. 1.
Figure 11:
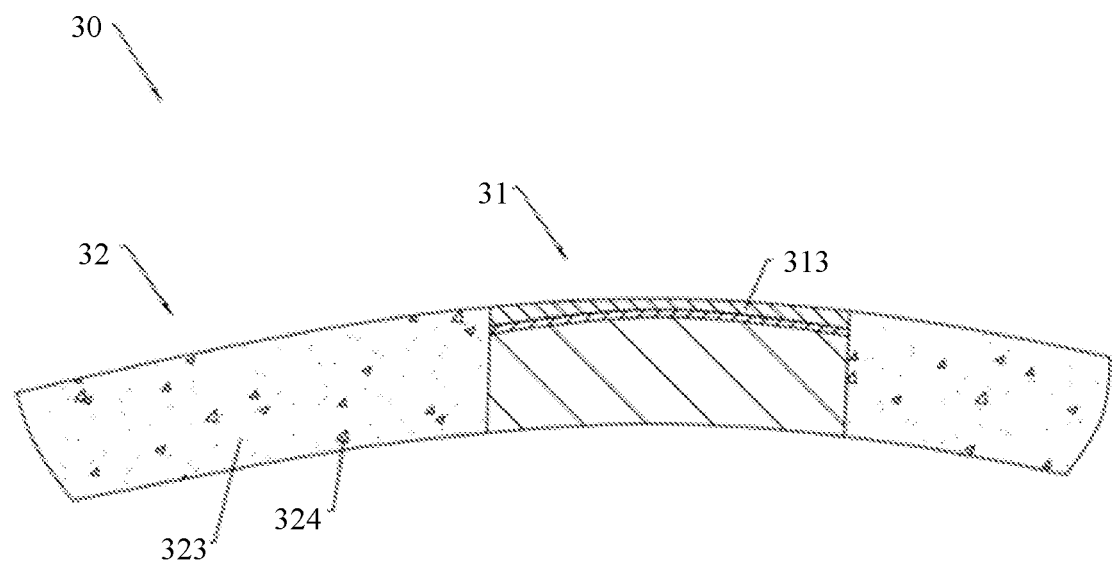
FIG. 11 is a schematic cross-sectional view of a lens shown in FIG. 10 at B-B.

The foregoing specifically describes the first embodiment, in which the anti-reflective film 322 is disposed in the second part 32 to reduce the transmittance of the second part 32. The following describes the second embodiment with reference to FIG. 10 and FIG. 11, in which the color masterbatch 324 is disposed in the substrate 323 of the second part 32 to reduce the transmittance of the second part 32. Technical content in the second embodiment that is the same as that in the first embodiment is not described in detail again. FIG. 10 is a schematic structural diagram of still another implementation of the lens 30 of the head-mounted display apparatus 100 shown in FIG. 1. FIG. 11 is a schematic cross-sectional view of the lens 30 shown in FIG. 10 at B-B.

Referring to FIG. 10 and FIG. 11, the second part 32 includes the substrate 323 and the color masterbatch 324 mixed in the substrate 323. In this embodiment, the first body part 326 includes the substrate 323 and the color masterbatch 324 mixed in the substrate 323. For a structural layout of the second body part 327, refer to the layout of the first body part 326. It can be understood that the masterbatch 324 is a plastic colorant obtained by well dispersing a pigment and a thermoplastic resin. For example, the pigment may be, but is not limited to, titanium dioxide, carbon black, or iron oxide red. In another embodiment, color masterbatch powder or another colorant may be alternatively mixed in the substrate 323.

In this embodiment, the color masterbatch 324 is disposed in the substrate 323 of the second part 32, to reduce the transmittance of the second part 32. In this case, when the eyes of the user move and shifts from directly facing the first part 31 to directly facing the second part 32, the user does not feel uncomfortable because of a large difference in brightness of received ambient light, thereby improving user experience of the head-mounted display apparatus 100 in this embodiment.

In addition, a manner of fabricating the second part 32 is simple and is easy to perform. In addition, transmittances of all regions of the second part 32 are relatively uniform.

Optionally, the second part 32 is formed through a dyeing process. Specifically, the color masterbatch 324 is evenly mixed in a resin (for example, polyamide (polyamide, PA) or polycarbonate (polycarbonate, PC)). Then the evenly mixed resin is molded through injection molding, that is, a form of the second part 32 is preliminarily formed. For example, a resin to which a color masterbatch 324 is added and that is melted through heating is injected into a mold, and a molded lens 30 is obtained after cooling.

In addition, a composition proportion of the color masterbatch 324 in the resin may be adjusted based on the transmittance of the first part 31, to make the transmittance of the second part 32 equal to that of the first part 31.

Optionally, the substrate 323 and the compensating prism 313 are made of a same material. In this case, a refractive index of the substrate 323 is the same as that of the compensating prism 313. Therefore, a real world image seen by the user through the first part 31 and a real world image seen through the second part 32 can be spliced into an integrated real world image. In this case, visual comfort of the user is relatively good. In other words, when the refractive index of the substrate 323 is different from that of the compensating prism 313, a real world image seen by the user through the first part 31 and a real world image seen through the second part 32 cannot be spliced into an integrated real world image due to different imaging angles or different imaging powers. In this case, when the eyes of the user are shifted from the location of the first part 31 to the location of the second part 32, the image seen by the user changes greatly or abruptly. In this case, visual comfort of the user is relatively poor.

Figure 12:
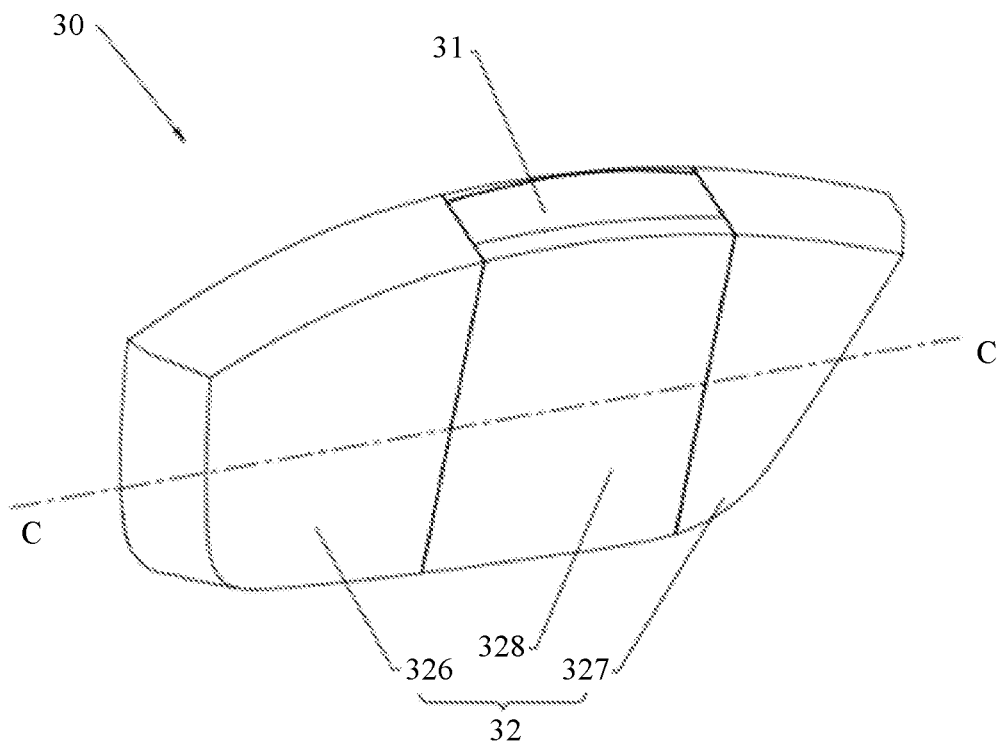
FIG. 12 is a schematic structural diagram of still another implementation of a lens of a head-mounted display apparatus shown in FIG. 1.
Figure 13:
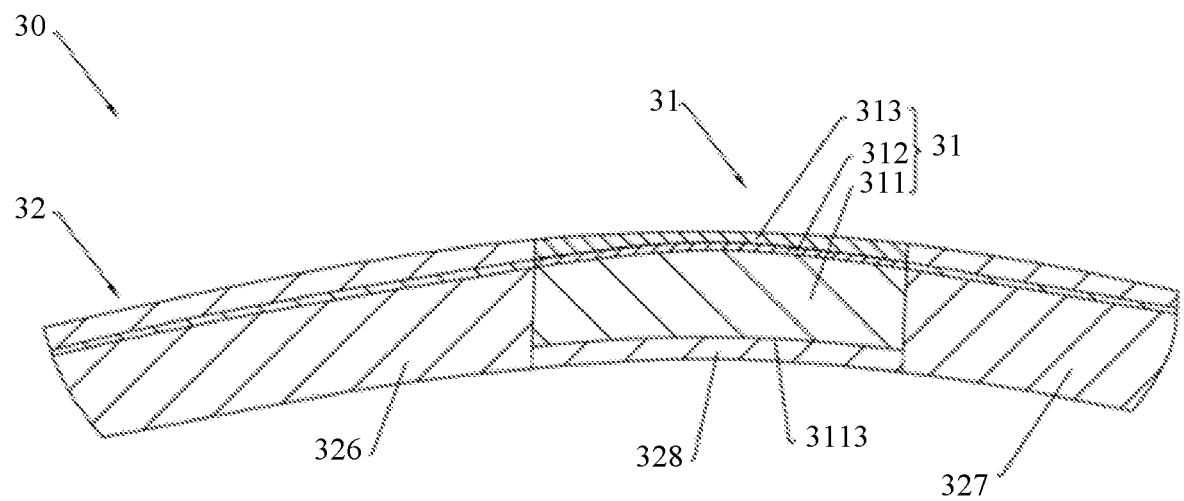
FIG. 13 is a schematic cross-sectional view of a lens shown in FIG. 12 at a line C-C.
Figure 14:
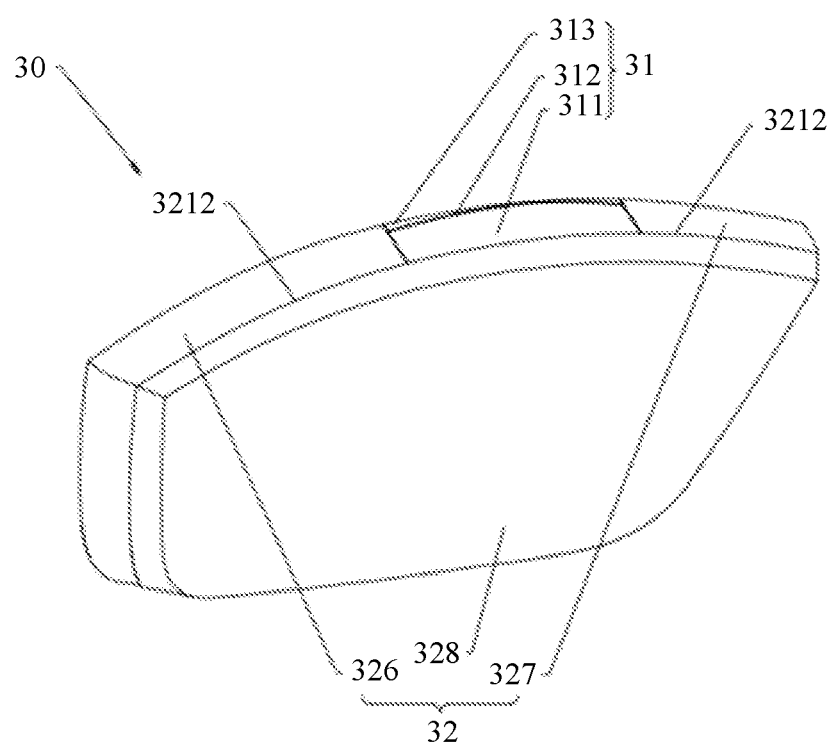
FIG. 14 is a schematic structural diagram of still another implementation of a lens of a head-mounted display apparatus shown in FIG. 1.

The foregoing describes in detail the embodiments of the second part 32 with a first structure. The following describes a second structure of the second part 32 with reference to FIG. 12, FIG. 13, and FIG. 14. Most technical content in embodiments of the second part 32 with the second structure is the same as that in the embodiments of the second part 32 with the first structure, and is not described in detail again. FIG. 12 is a schematic structural diagram of still another implementation of the lens 30 of the head-mounted display apparatus 100 shown in FIG. 1. FIG. 13 is a schematic cross-sectional view of the lens 30 shown in FIG. 12 at a line C-C. FIG. 14 is a schematic structural diagram of still another implementation of the lens 30 of the head-mounted display apparatus 100 shown in FIG. 1.

Referring to FIG. 12 and FIG. 13, the second part 32 further includes a third body part 328. The third body part 328 is connected between the first body part 326 and the second body part 327, and the third body part 328 is adjacent to the first exit plane 3113 of the first part 31. It can be understood that the first exit plane 3113 of the first part 31 is a surface on which the display light and the ambient light exit from the first part 31.

In referring to FIG. 13, one end of the third body part 328 is connected to a surface of the first body part 326 that faces the first part 31, and the other end is connected to a surface of the second body part 327 that faces the first part 31. Connection relationships between the third body part 328 and the first body part 326, and between the third body part 328 and the second body part 327 are not limited to those shown in FIG. 13. The connection relationships between the third body part 328 and the first body part 326, and between the third body part 328 and the second body part 327 may be alternatively a structure shown in FIG. 14. Refer to the following descriptions.

In this embodiment, when the first body part 326 and the second body part 327 are fixed to two sides of the first part 31, and the third body part 328 is located on a light exit side of the first part 31, the first body part 326, the second body part 327, and the third body part 328 surround a periphery of the first part 31. In this case, the first body part 326, the second body part 327, and the third body part 328 can effectively protect the first part 31, to avoid damage to the first part 31 due to collision with another device.

In addition, when the first body part 326, the second body part 327, and the third body part 328 surround the first part 31, the first body part 326, the second body part 327, and the third body part 328 are relatively highly integrated with the first part 31. In this case, the lens 30 also has relatively high structural strength.

Optionally, the third body part 327 is fastened to the first body part 326 and the second body part 327 by using an optically clear adhesive. Further, the third body part 327 is fastened to the first part 31 by using an optically clear adhesive.

Optionally, the third body part 327, the first body part 326, and the second body part 327 are made of a same material.

As shown in FIG. 13, when the first part 31 includes the free-form prism 311, the beam splitter 312, and the compensating prism 313 that are sequentially stacked, the third body part 328 is fastened to the first exit plane 3113 (refer to the first exit plane 3113 in FIG. 3) of the free-form prism 311. In this case, the first body part 326, the second body part 327, and the third body part 328 are located at a periphery of the free-form prism 311, the beam splitter 312, and the compensating prism 313 that are stacked.

Optionally, the third body part 328, the first body part 326, and the second body part 327 are integrally molded. In this case, the second part 32 has relatively high integrity. In addition, compared with a method for separately fabricating the first body part 326, the second body part 327, and the third body part 328, and then splicing the first body part 326, the second body part 327, and the third body part 328 into the second part 32, in this embodiment, the third body part 328, the first body part 326, and the second body part 327 are integrally molded, thereby simplifying a fabrication process for the second part 32 and further reducing the costs of the second part 32.

It can be understood that, for structural layouts of the first body part 326 and the second body part 327 in this embodiment, reference may be made to the structural layouts of the first body part 326 and the second body part 327 in the foregoing embodiment (for example, the anti-reflective film 322 is disposed in the first body part 326 to reduce the transmittance of the second part 32, or the color masterbatch 324 is disposed in the substrate 323 of the first body part 326 to reduce the transmittance of the second part 32). Details are not described herein again.

As shown in FIG. 14, technical content that is the same as that in the foregoing embodiment is not described in detail again: One end of the third body part 328 is connected to the second exit plane 3212 of the first body part 326, and the other end is connected to the second exit plane 3212 of the second body part 327.

Optionally, in a process of forming the lens 30 through assembly, the free-form prism 311, the beam splitter 312, and the compensating prism 313 of the first part 31 may be sequentially stacked on the third body part 328 first. The first body part 326 and the second body part 327 are spliced around the first part 31, and are fastened to a surface of the third body part 328 that faces the first part 31.

Figure 15A:
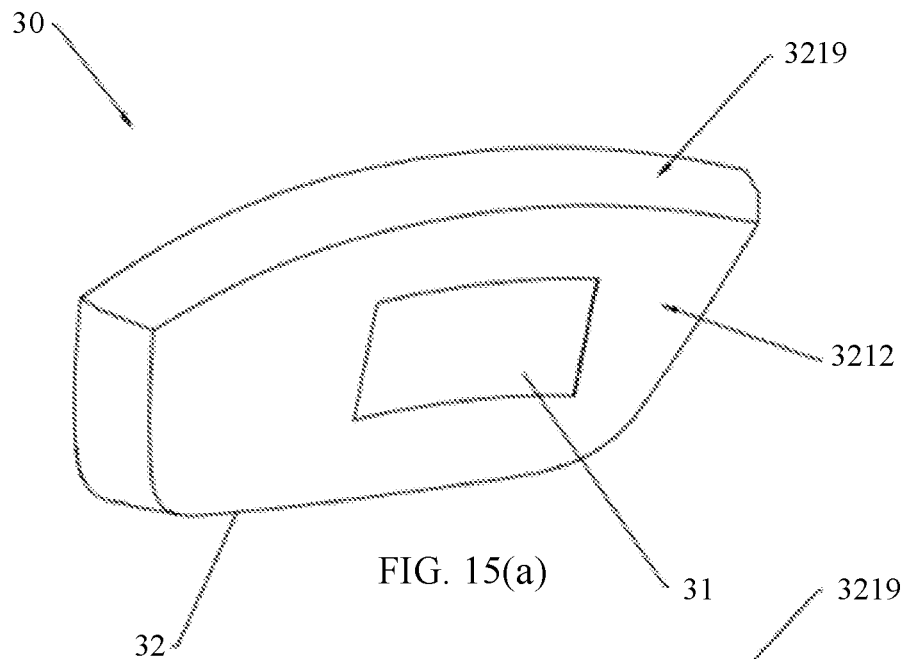
FIG. 15(a) and FIG. 15(b) are a schematic structural diagram of still another implementation of a lens of a head-mounted display apparatus shown in FIG. 1, where
Figure 15B:
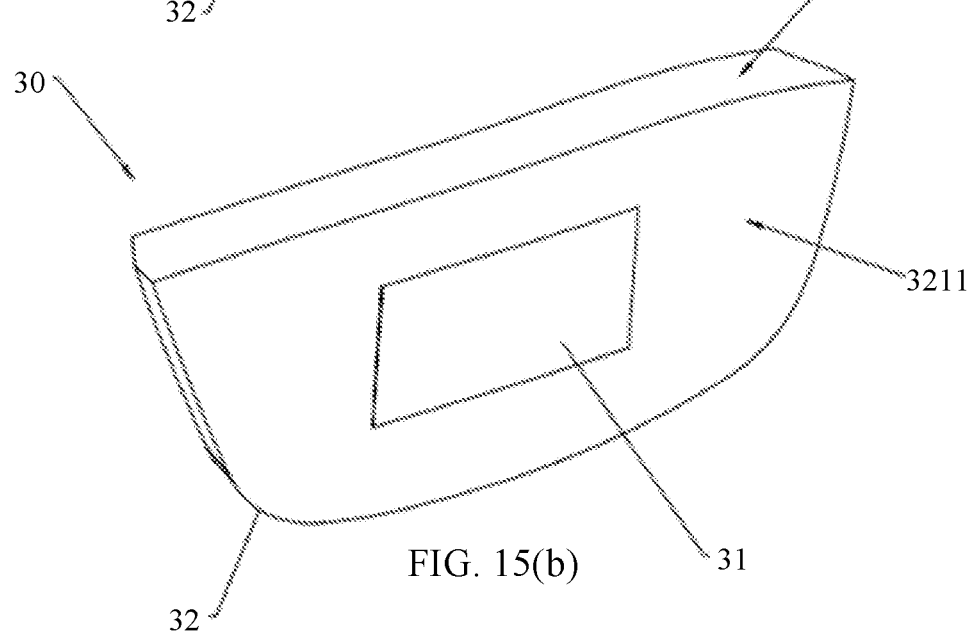
Figure 16:
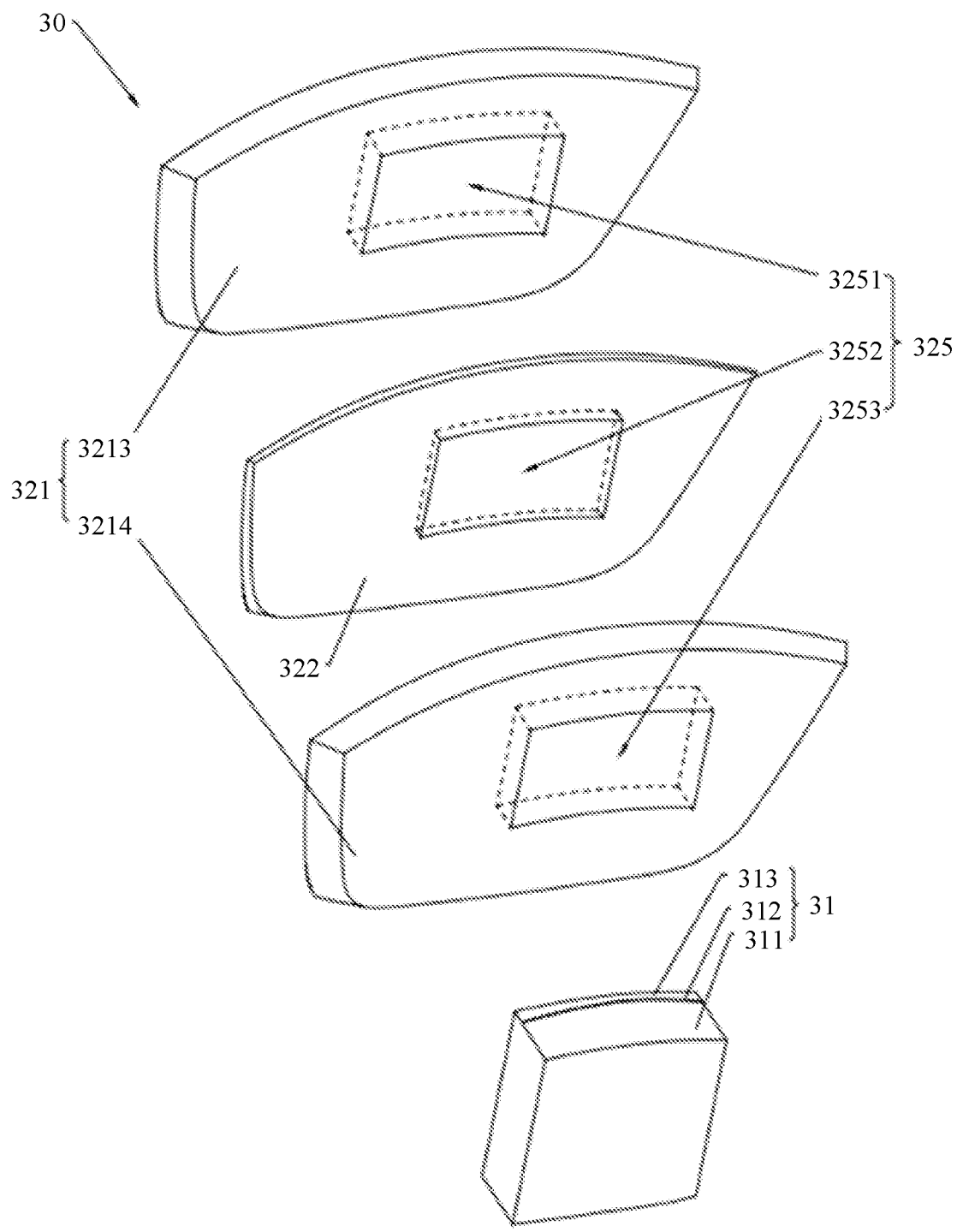
FIG. 16 is a partial schematic exploded view of a lens shown in FIG. 15(a) and FIG. 15(b)
Figure 17:
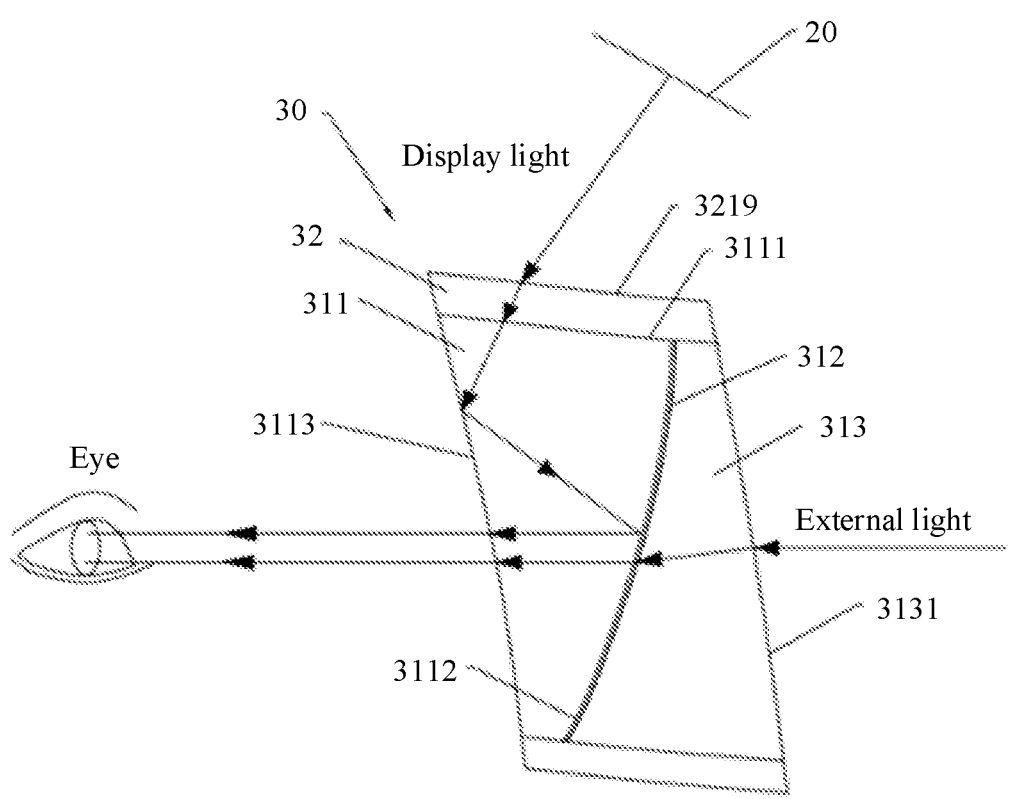
FIG. 17 is a diagram of light propagation paths when a lens shown in FIG. 15(a) and FIG. 15(b) cooperates with a display module.

The foregoing describes the second part 32 with the second structure. The following specifically describes a third structure of the second part 32 with reference to FIG. 15(a) and FIG. 15(b) to FIG. 17. FIG. 15(a) and FIG. 15(b) are a schematic structural diagram of still another implementation of the lens 30 of the head-mounted display apparatus 100 shown in FIG. 1. FIG. 15(a) is a schematic diagram of the lens 30 from a particular perspective. FIG. 15(b) is a schematic diagram of the lens 30 from another perspective. FIG. 16 is a partial schematic exploded view of the lens shown in FIG. 15(a) and FIG. 15(b). FIG. 17 is a diagram of light propagation paths when the lens 30 shown in FIG. 15(a) and FIG. 15(b) cooperates with the display module 20.

Referring to FIG. 15(a) and FIG. 15(b) and FIG. 16, the second part 32 is a ring-shaped structure. The second part 32 has an accommodation space 325. The first part 31 is disposed in the accommodation space 325. It can be understood that, FIG. 16 illustrates that the accommodation space 325 is formed by splicing a first space 3251, a second space 3252, and a third space 3253. However, the accommodation space 325 may be alternatively formed by an integral space.

In addition, the second part 32 includes a first incident plane 3211 and a second exit plane 3212 that are opposite to each other. The accommodation space 325 extends from the first incident plane 3211 to the second exit plane 3212. When the first part 31 is disposed in the accommodation space 325, the first part 31 is fastened to a side wall of the accommodation space 325, that is, the second part 32 surrounds a peripheral side surface of the first part 31.

In this embodiment, when the first part 31 is disposed in the accommodation space 325, the second part 32 surrounds the peripheral side surface of the first part 31. In this case, the second part 32 can effectively protect the first part 31, to avoid damage to the first part 31 due to collision with another device.

In addition, when the second part 32 surrounds the peripheral side surface of the first part 31, the second part 32 is relatively highly integrated with the first part 31. In this case, the lens 30 also has relatively high structural strength.

It can be understood that the second part 32 is configured with a ring-shaped structure, thereby facilitating assembly of the first part 31 and the second part 32. In addition, a connection area of the first part 31 and the second part 32 is relatively large, so that the connection between the first part 31 and the second part 32 is more secure, that is, the first part 31 is not likely to detach from the second part 32.

In addition, in some cases, for a first part 31 with a relatively small optical index (for example, a first part 31 whose exit pupil area (also referred to as an eyebox) has a relatively small area, or a first part with a relatively small field of view (FOV)), the first part 31 is assembled on the second part 32 with the ring-shaped structure, so that areas of the first part 31 in all directions can be significantly increased, thereby significantly increasing an area of the lens 30. In this case, the user has a relatively wide field of vision and relatively good visual comfort.

In addition, in some cases, when an optical index of the free-form prism 311 is determined, the second part 32 can also be disposed in the foregoing structure. To be specific, when a volume of the free-form prism 311 is determined, the free-form prism 311 is assembled on the second part 32 with the ring-shaped structure, so that the areas of the free-form prism 311 in different directions can be significantly increased, thereby significantly increasing an area of the lens 30. In this case, the user has a relatively wide field of vision and relatively good visual comfort.

In this implementation, ambient light enters the second part 32 through the first incident plane 3211, and exits from the second part 32 through the second exit plane 3212, that is, the user can see a real world through the second part 32.

In addition, as shown in FIG. 15(a) and FIG. 15(b), the second part 32 includes a second incident plane 3219. The second incident plane 3219 is connected between the first incident plane 3211 and the second exit plane 312. The second incident plane 3219 is configured to enable display light emitted by the display module 20 (refer to FIG. 17) to enter the second part 32 and enter the first part 31 through the second part 32.

As shown in FIG. 17, after the display module 20 emits the display light, the display light enters the second part 32 through the second incident plane 3219. The display light that enters the second part 32 exits from the second part 32, and enters the free-form prism 311 through the second incident plane 3111 of the free-form prism 311. In this case, a part of the display light propagates to the beam splitter 312 through reflection by the first exit plane 3113. This part of display light is then reflected by the beam splitter 312, exits from the first exit plane 3113, and is projected onto the eyes of the user. In this case, the user can receive a virtual image transmitted by the display module 20. In addition, ambient light enters the compensating prism 313 through the third incident plane 3131 of the compensating prism 313. In this case, the ambient light sequentially passes through the compensating prism 313 and the beam splitter 312 and propagates to the first incident plane 3112, and enters the free-form prism 311 through the first incident plane 3112. The ambient light that enters the free-form prism 311 exits from the first exit plane 3113, and is projected onto the eyes of the user. In this case, the user can receive the ambient light, that is, the user can see a real world. Therefore, the user can see, through the first part 31, a composite image combining a real image and a virtual image.

As shown in FIG. 16, the first part 31 includes the free-form prism 311, the beam splitter 312, and the compensating prism 313 that are sequentially stacked. In this case, the free-form prism 311, the beam splitter 312, and the compensating prism 313 are accommodated in the accommodation space 325. It can be understood that a manner of disposing the free-form prism 311, the beam splitter 312, and the compensating prism 313 may be the same as that of disposing the free-form prism 311, the beam splitter 312, and the compensating prism 313 in the embodiment of the second part 32 with the first structure. Details are not described herein.

As shown in FIG. 16, the second part 32 includes an optical lens 321 and the anti-reflective film 322. It can be understood that both the optical lens 321 and the anti-reflective film 322 are ring-shaped. In addition, for a manner of disposing the optical lens 321 and the anti-reflective film 322, refer to the manner of disposing the optical lens 321 and the anti-reflective film 322 of the second part 32 with the first structure. For example, the optical lens 321 includes a first light transmission part 3213 and a second light transmission part 3214 that face each other. The anti-reflective film 322 is disposed between the first light transmission part 3213 and the second light transmission part 3214. A difference from the foregoing embodiment lies in that the first light transmission part 3213, the second light transmission part 3214, and the anti-reflective film 322 are all in a ring-shaped structure. In this case, the first light transmission part 3213 is provided with the first space 3251. The anti-reflective film 322 is provided with the second space 3252. The second light transmission part 3214 is provided with the third space 3253. The first space 3251, the second space 3252, and the third space 3253 are spliced into the accommodation space 325. In addition, for the second part 32, reference may be alternatively made to the first structure in which the color masterbatch 324 is disposed in the substrate 323 of the second part 32 to reduce the transmittance of the second part 32.

Figure 18:
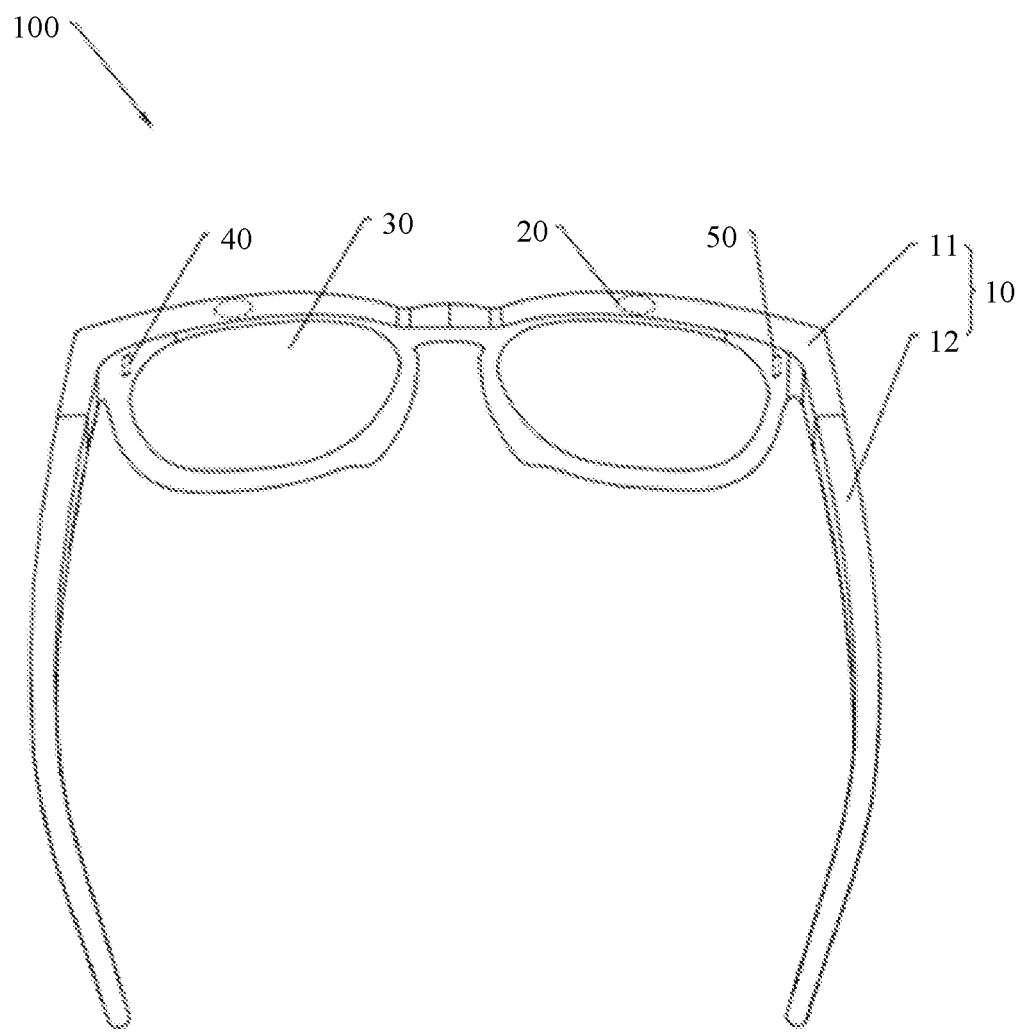
FIG. 18 is a schematic structural diagram of another implementation of a head-mounted display apparatus according to an embodiment of this application.

The foregoing describes example structures of the head-mounted display apparatus 100. The following describes yet another structure of the head-mounted display apparatus 100 with reference to FIG. 18. Technical content that is the same as that of the head-mounted display apparatus 100 with the first structure is not described in detail again. FIG. 18 is a schematic structural diagram of another implementation of the head-mounted display apparatus 100 according to an embodiment of this application.

Specifically, the head-mounted display apparatus 100 may further include an iris camera 40. The iris camera 40 is mounted on the lens frame 10. Optionally, the iris camera 40 is mounted on the frame 11. For example, the iris camera 40 may be, but is not limited to, an infrared camera. The iris camera 40 may obtain iris location change information of a user, and convert the iris location change information into coordinate information for the display module 20. There may be one iris camera 40 configured to detect iris location change information of one eye of the user. Certainly, there may be alternatively two iris cameras 40, configured to detect iris location change information of both eyes at the same time. In this case, iris location data collected by the two iris cameras 40 may supplement each other or may be corrected with reference to each other. It can be understood that the iris camera 40 collects the iris location change information of the user, so that the user can see different virtual images in different regions. For example, when the user directly looks at the lens 30 at a first moment, the user may see a weapon and a character in a first region. When an eye of the user moves, the iris camera 40 collects iris location change information of the eye, and converts the iris location change information into coordinate change information for the display module 20. In this case, when the user looks left at the lens 30 at a second moment, the user may see another weapon or another character in a second region.

Still referring to FIG. 18, the head-mounted display apparatus 100 may further include a structured light module 50. The structured light module 50 is mounted in the lens frame 10. The structured light module 50 may be configured to scan the face of the user, and obtain feature information of the face of the user. In this case, the feature information of the face is compared with preset face information. When a comparison result indicates that the obtained feature information is consistent with the preset face information, the head-mounted display apparatus 100 is turned on. When a comparison result indicates that the obtained feature information is inconsistent with the preset face information, the head-mounted display apparatus 100 is not turned on. In addition, the structured light module 50 may be further configured to cooperate with the display module 20 to implement virtual shopping. For example, when the user needs to purchase a new weapon, the display module 20 provides a shopping list of virtual objects for the user. In this case, the feature information obtained by the structured light module 50 may be used to confirm whether the user is to purchase a weapon.

In another implementation, the head-mounted display apparatus 100 may further include an earpiece, a microphone, and a wireless charging apparatus. The earpiece and the microphone are mounted in the lens frame 10. In this case, the user may listen to voice information from another user by using the earpiece, for example, listen to combat information from a teammate. Voice information may be input by using the microphone. In this case, the user may operate a virtual interface of the display module 20 by using the voice information. In addition, the head-mounted display apparatus 100 may be wirelessly charged by using the wireless charging apparatus.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A head-mounted display device, comprising a lens frame, a lens, and a display circuit, wherein both the lens and the display circuit are disposed on the lens frame;
   the lens comprises a first part and a second part, wherein the first part is adjacent to the second part;
   the first part is configured to transmit ambient light and display light emitted by the display circuit;
   the second part is configured to transmit the ambient light; and
   a ratio of a transmittance of the second part to a transmittance of the first part is within a threshold range, wherein the threshold range is between 0.5 to 1.5;
   wherein the first part comprises a free-form prism, a beam splitter, and a compensating prism that are sequentially stacked;
   the beam splitter is disposed between the free-form prism and the compensating prism;
   the free-form prism comprises a first incident plane, a first exit plane, and a second incident plane, wherein the first incident plane is adjacent to the beam splitter;
   that the first part is configured to transmit ambient light comprises:
   the compensating prism is configured to receive the ambient light, and the ambient light passes through the beam splitter, enters from the first incident plane of the free-form prism, and passes through the first exit plane; and
   that the first part is further configured to transmit display light emitted by the display circuit comprises:
   the second incident plane of the free-form prism is configured to receive the display light emitted by the display circuit, and the beam splitter is configured to reflect, to the first exit plane, the display light received by the second incident plane.

2. The head-mounted display device according to claim 1, wherein the second part comprises an optical lens and an anti-reflective film, the optical lens comprises a first incident plane and a second exit plane that are opposite to each other, the anti-reflective film is located between the first incident plane of the optical lens and the second exit plane, and the ambient light sequentially passes through the first incident plane of the optical lens and the anti-reflective film, and then exits from the second exit plane.

3. The head-mounted display device according to claim 2, wherein
   a first side surface of the first part is adjacent to a second side surface of the second part;
   a shape of a part, located on the first side surface, of the beam splitter is a first shape;
   a shape of a part, located on the second side surface, of the anti-reflective film is a second shape; and
   the first shape matches the second shape.

4. The head-mounted display device according to claim 3, wherein the optical lens comprises a first light transmission part and a second light transmission part that face each other, a surface of the first light transmission part that is away from the second light transmission part is the first incident plane, a surface of the second light transmission part that is away from the first light transmission part is the second exit plane, and the anti-reflective film is between the first light transmission part and the second light transmission part.

5. The head-mounted display device according to claim 4, wherein the anti-reflective film is a plating layer formed, by using a magnetron sputtering or vapor deposition process, on a surface of the first light transmission part that faces the second light transmission part or a surface of the second light transmission part that faces the first light transmission part.

6. The head-mounted display device according to claim 4, wherein the head-mounted display device is an augmented reality device.

7. The head-mounted display device according to claim 2, wherein the anti-reflective film comprises one or more of a beam splitter, an absorbing film, or a polarizing film.

8. The head-mounted display device according to claim 1, wherein the second part comprises a substrate and a color masterbatch mixed in the substrate.

9. The head-mounted display device according to claim 1, wherein the second part comprises a first body part and a second body part, and the first body part and the second body part are respectively located on either side of the first part.

10. The head-mounted display device according to claim 9, wherein the second part further comprises a third body part, the third body part is disposed between the first body part and the second body part, and the third body part is adjacent to the first exit plane of the first part.

11. The head-mounted display device according to claim 1, wherein the second part is a ring-shaped structure and has an accommodation space, and the first part is disposed in the accommodation space.

12. A lens disposed in a head-mounted display device, wherein the lens comprises a first part and a second part, the first part is adjacent to the second part, a ratio of a transmittance of the second part to a transmittance of the first part is within a threshold range, and the threshold range is 0.5 to 1.5;
   the first part comprises a free-form prism, a beam splitter, and a compensating prism that are sequentially stacked;
   the beam splitter is disposed between the free-form prism and the compensating prism;
   the free-form prism comprises a first incident plane, a first exit plane, and a second incident plane, wherein the first incident plane is adjacent to the beam splitter;
   the compensating prism is configured to receive ambient light, and the ambient light passes through the beam splitter, enters from the first incident plane of the free-form prism, and passes through the first exit plane;
   the second incident plane of the free-form prism is configured to receive display light emitted by a display circuit, and the beam splitter is configured to reflect, to the first exit plane, the display light received by the second incident plane; and
   the second part is configured to transmit the ambient light.

13. The lens according to claim 12, wherein
   the second part comprises an optical lens and an anti-reflective film, the optical lens comprises a first incident plane and a second exit plane that back each other, the anti-reflective film is located between the first incident plane of the optical lens and the second exit plane, and the ambient light sequentially passes through the first incident plane of the optical lens and the anti-reflective film, and then exits from the second exit plane.

14. The lens according to claim 13, wherein a first side surface of the first part is adjacent to a second side surface of the second part;
- a shape of a part, located on the first side surface, of the beam splitter is a first shape;
- a shape of a part, located on the second side surface, of the anti-reflective film is a second shape; and
- the first shape matches the second shape.

15. The lens according to claim 14, wherein the second part has a ring-shaped structure, the second part has an accommodation space, and the first part is disposed in the accommodation space.

16. The lens according to claim 13, wherein the second part has a ring-shaped structure, the second part has an accommodation space, and the first part is disposed in the accommodation space.

17. The lens according to claim 12, wherein the second part comprises a substrate and a color masterbatch mixed in the substrate.

18. The lens according to claim 17, wherein the second part has a ring-shaped structure, the second part has an accommodation space, and the first part is disposed in the accommodation space.

19. The lens according to claim 12, wherein the second part is a ring-shaped structure, the second part has an accommodation space, and the first part is disposed in the accommodation space.

* * * * *